United States Patent
Kwon et al.

(10) Patent No.: US 10,153,886 B2
(45) Date of Patent: Dec. 11, 2018

(54) APPARATUS AND METHOD FOR DOWNLINK AND UPLINK MULTI-USER TRANSMISSIONS

(71) Applicant: NEWRACOM, INC., Irvine, CA (US)

(72) Inventors: Young Hoon Kwon, Irvine, CA (US); Ahmad Reza Hedayat, Irvine, CA (US)

(73) Assignee: NEWRACOM, INC., Lake Forest, CA (US)

( * ) Notice: Subject to any disclaimer, the term of this patent is extended or adjusted under 35 U.S.C. 154(b) by 24 days.

(21) Appl. No.: 15/352,435

(22) Filed: Nov. 15, 2016

(65) Prior Publication Data

US 2017/0063511 A1    Mar. 2, 2017

Related U.S. Application Data

(63) Continuation of application No. 15/078,920, filed on Mar. 23, 2016, now Pat. No. 9,531,520.

(Continued)

(51) Int. Cl.
*H04L 5/00* (2006.01)
*H04W 72/04* (2009.01)
(Continued)

(52) U.S. Cl.
CPC .............. *H04L 5/0055* (2013.01); *H04L 1/18* (2013.01); *H04L 1/1887* (2013.01);
(Continued)

(58) Field of Classification Search
CPC ....... H04L 1/18; H04L 1/1887; H04L 1/1896; H04L 5/00; H04L 5/0055;
(Continued)

(56) References Cited

U.S. PATENT DOCUMENTS 9,819,460 B2 * 11/2017 Seok .................... H04B 7/0452
9,967,877 B2 *  5/2018 Seok ................. H04W 72/0446
(Continued)

OTHER PUBLICATIONS

"Part 11: Wireless LAN Medium Access Control (MAC) and Physical Layer (PHY) Specifications", IEEE Standards 802.11™—2012 (Revision of IEEE Standard 802.11-2007), Mar. 29, 2012, pp. 1-2695, IEEE (The Institute of Electrical and Electronic Engineers, Inc.), New York, NY, USA.

(Continued)

*Primary Examiner* — Tri H Phan

(57) ABSTRACT

Methods and devices are described that facilitate uplink multi-user acknowledgment transmissions. In particular, acknowledgment information may be located in a media access control (MAC) header of a payload section of a MAC Protocol Data Unit within a downlink multi-user frame. The acknowledgment information may be present in each resource unit of the downlink multi-user frame to indicate to each corresponding station properties/characteristics of a subsequent acknowledgment transmission. The properties may include one or more of (1) whether the acknowledgement transmission is multi-user or single user, (2) whether the acknowledgement transmission is transmitted immediately following receipt of the downlink multi-user frame or upon receipt of a multi-user block acknowledgement request frame, and (3) resource scheduling information for an uplink multi-user acknowledgement transmission.

16 Claims, 13 Drawing Sheets

Related U.S. Application Data

(60) Provisional application No. 62/140,349, filed on Mar. 30, 2015, provisional application No. 62/137,138, filed on Mar. 23, 2015.

(51) Int. Cl.
*H04W 72/12* (2009.01)
*H04L 1/18* (2006.01)
*H04L 1/00* (2006.01)

(52) U.S. Cl.
CPC ......... *H04L 1/1896* (2013.01); *H04W 72/042* (2013.01); *H04W 72/0446* (2013.01); *H04W 72/1268* (2013.01); *H04L 2001/0093* (2013.01)

(58) Field of Classification Search
CPC .......... H04L 2001/0093; H04W 72/04; H04W 72/042; H04W 72/0446; H04W 72/12; H04W 72/1268
See application file for complete search history.

(56) References Cited

U.S. PATENT DOCUMENTS

| | | | |
|---|---|---|---|
| 10,021,721 B2* | 7/2018 | Park | H04W 74/0816 |
| 2010/0014448 A1 | 1/2010 | Wentink et al. | |
| 2010/0220654 A1 | 9/2010 | Wentink | |
| 2010/0310003 A1 | 12/2010 | Lauer et al. | |
| 2012/0213308 A1 | 8/2012 | Merlin et al. | |
| 2013/0229996 A1 | 9/2013 | Wang et al. | |
| 2013/0301569 A1 | 11/2013 | Wang et al. | |
| 2016/0021678 A1* | 1/2016 | Merlin | H04W 72/1268 370/329 |
| 2016/0056930 A1* | 2/2016 | Seok | H04L 5/0026 370/330 |
| 2016/0088602 A1* | 3/2016 | Seok | H04L 5/0055 370/338 |
| 2016/0105836 A1* | 4/2016 | Seok | H04W 72/042 370/331 |
| 2016/0113034 A1* | 4/2016 | Seok | H04W 74/04 370/329 |
| 2016/0128057 A1* | 5/2016 | Seok | H04L 5/0055 370/329 |
| 2016/0143026 A1* | 5/2016 | Seok | H04W 72/0413 370/329 |
| 2016/0165589 A1* | 6/2016 | Chu | H04L 5/0007 370/329 |
| 2016/0174200 A1* | 6/2016 | Seok | H04W 72/04 370/329 |
| 2016/0242177 A1* | 8/2016 | Seok | H04W 72/0446 |
| 2017/0238286 A1* | 8/2017 | Chun | H04W 72/042 370/329 |
| 2018/0007661 A1* | 1/2018 | Chun | H04W 72/04 |

OTHER PUBLICATIONS

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™—2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

International Search Report and Written Opinion for International Patent Application No. PCT/US2016/023829 filed Mar. 23, 2016.

Simone Merlin et al., "Multi-STA Acknowledgment", IEEE 802.11-15/0366r1, Mar. 9, 2015, pp. 1-17, IEEE.

Kiseon Ryu et al., "UL MU Procedure", IEEE 802.11-15/0365r0, Mar. 9, 2015, pp. 1-16, IEEE.

Extended European Search Report for EP Application No. 16769635.0, dated Oct. 16, 2018.

\* cited by examiner

APPARATUS AND METHOD FOR DOWNLINK AND UPLINK MULTI-USER TRANSMISSIONS

CROSS-REFERENCE TO RELATED APPLICATIONS

This application is a continuation of U.S. patent application Ser. No. 15/078,920, entitled "APPARATUS AND METHOD FOR DOWNLINK AND UPLINK MULTI-USER TRANSMISSIONS," filed on Mar. 23, 2016, which claims the benefit of priority from U.S. Provisional Application No. 62/137,138, entitled "APPARATUS AND METHODS FOR DOWNLINK MULTI-USER TRANSMISSION," filed Mar. 23, 2015 and U.S. Provisional Application No. 62/140,349, entitled "APPARATUS AND METHODS FOR TRANSMITTING RESPONSE FRAMES," filed Mar. 30, 2015, which are incorporated herein by reference in its entirety.

TECHNICAL FIELD

The present description relates in general to wireless communication systems and methods, and more particularly to, for example, without limitation, systems and methods for multi-user transmission of response frames.

BACKGROUND

Wireless local area network (WLAN) devices are deployed in diverse environments. These environments are generally characterized by the existence of access points and non-access point stations. In some systems, stations may utilize multi-user (MU) transmissions to more efficiently communicate data. In particular, an access point may transmit a single downlink (DL) Orthogonal Frequency Division Multiple Access (OFDMA) frame that assigns particular resource units (RUs) to separate stations in the wireless system. Each RU may include data and/or control information that is intended for a single station or a set of stations.

Although described in relation to OFDMA, MU transmissions may be implemented through the use of Multiple-Input and Multiple-Output (MIMO) techniques. MU-MIMO techniques utilize multiple transmit and receive antennas to exploit multipath propagation. MIMO may be used separately or jointly with OFDMA to transmit data and control information in both the downlink and uplink directions.

The description provided in the background section should not be assumed to be prior art merely because it is mentioned in or associated with the background section. The background section may include information that describes one or more aspects of the subject technology.

SUMMARY

A method, implemented by a network device in a wireless network, for coordinating an uplink multi-user response transmission to a downlink multi-user transmission is described herein. The method may comprise: generating, by the network device, a downlink multi-user frame addressed to a plurality of stations operating in the wireless network, the downlink multi-user frame including a plurality of resource units that are each assigned to a station in the plurality of stations, wherein generating the downlink multi-user frame comprises: including a set of MAC Protocol Data Units (MPDUs) in each resource unit of the plurality of resource units, wherein one or more MPDUs in each of the resource units in the downlink multi-user frame includes acknowledgement information for indicating properties of a multi-user acknowledgement transmission transmitted by each respective station in the plurality of stations to acknowledge the downlink multi-user frame; and transmitting the downlink multi-user frame to the plurality of stations over a wireless channel.

In one embodiment, generating the downlink multi-user frame further comprises: including the acknowledgement information, for indicating properties of the multi-user acknowledgement transmission transmitted by each respective station in the plurality of stations to acknowledge the downlink multi-user frame, in a header of the one or more MPDUs. In one embodiment, the header is a MAC header of the one or more MPDUs.

In one embodiment, one of the one or more MPDUs in each of the resource units in the downlink multi-user frame is a unicast trigger frame that contains the acknowledgement information for the respective station in the plurality of stations. In one embodiment, the trigger frame instigates each respective station in the plurality of stations to transmit the multi-user acknowledgement transmission after an interframe spacing period following receipt of the downlink multi-user frame.

In one embodiment, the method further comprises: generating, by the network device, a multi-user block acknowledgement request frame to solicit acknowledgements from two or more stations of the plurality of stations; and transmitting the multi-user block acknowledgment request frame following transmission of the downlink multi-user frame.

In one embodiment, the acknowledgement information includes one or more of: (1) whether the acknowledgement transmission is multi-user or single user, (2) whether the acknowledgment transmission is immediate or non-immediate, and (3) resource scheduling information for the multi-user acknowledgement transmission.

A method, implemented by a first station in a wireless network, for transmitting an uplink acknowledgment is also described here. The method comprises: receiving a downlink multi-user frame addressed to a plurality of stations, including the first station, and received from an access point in the wireless network; processing a first MAC Protocol Data Units (MPDU) in the downlink multi-user frame to determine acknowledgement information for indicating properties of a first multi-user acknowledgement frame to acknowledge the downlink multi-user frame by two or more stations; generating the first multi-user acknowledgment frame based on the acknowledgement information; and transmitting the first multi-user acknowledgement frame to the access point based on the acknowledgement information.

In one embodiment, the first MPDU is located in a first resource unit of the downlink multi-user frame allocated to the first station, wherein the downlink multi-user frame includes a second resource unit that contains a second MPDU with acknowledgement information for a second station to transmit a second multi-user acknowledgement frame. In one embodiment, the first multi-user acknowledgement frame and the second multi-user acknowledgement frame together form a multi-user acknowledgement frame for acknowledging the downlink multi-user frame.

In one embodiment, processing the first MPDU comprises: extracting the acknowledgement information, for indicating properties of the first multi-user acknowledgement frame, in a header of the first MPDU. In one embodiment, the header is a MAC header of the first MPDU.

In one embodiment, processing the MPDU comprises: extracting the acknowledgement information, for indicating properties of the first multi-user acknowledgement frame transmission, from a payload of the first MPDU, wherein the first MPDU is a unicast trigger frame. In one embodiment, the method further comprises: processing a second MPDU in a same resource unit as the first MPDU, wherein the second MPDU includes data intended for the first station. In one embodiment, the trigger frame instigates the first station to transmit the first multi-user acknowledgement after an interframe spacing period following receipt of the downlink multi-user frame.

In one embodiment, the method further comprises: receiving a multi-user block acknowledgement request frame that solicits acknowledgements from two or more stations, wherein the first multi-user acknowledgement frame is transmitted after receipt of and in response to the multi-user block acknowledgement request frame.

In one embodiment, the acknowledgement information includes one or more of: (1) whether the first multi-user acknowledgement frame is part of multi-user or single user transmission, (2) whether the first multi-user acknowledgement frame is transmitted immediately following receipt of the downlink multi-user frame or upon receipt of a multi-user block acknowledgement request frame, and (3) resource scheduling information for an uplink multi-user acknowledgement transmission.

A method, implemented by a first station in a wireless network, for transmitting an uplink acknowledgment is described herein. In one embodiment, the method comprises: receiving a downlink multi-user frame addressed to a plurality of stations, including the first station, wherein the downlink multi-user frame is received from an access point in the wireless network; receiving a multi-user block acknowledgement request frame that solicits acknowledgements from two or more stations, wherein the multi-user block acknowledgement request frame includes acknowledgement information for indicating properties of a first multi-user acknowledgement frame that acknowledges receipt of the downlink multi-user frame by the first station; generating the first multi-user acknowledgment frame based on the acknowledgement information; and transmitting the first multi-user acknowledgement frame to the access point based on the acknowledgement information.

In one embodiment, the acknowledgement information includes one or more of: (1) whether the first multi-user acknowledgement frame is part of a multi-user or single user transmission and (2) resource scheduling information for the first multi-user acknowledgement transmission. In one embodiment, the acknowledgment scheduling information includes properties of a second multi-user acknowledgement frame generated and transmitted by a second station, wherein the first multi-user acknowledgement frame and the second multi-user acknowledgement together form a multi-user transmission.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

During the standardization activities of the Institute of Electrical and Electronics Engineers (IEEE) 802.11, multi-user (MU) simultaneous transmission techniques such as Orthogonal Frequency Division Multiple Access (OFDMA) and Multi-User Multiple Input Multiple Output (MU-MIMO) are considered to improve network efficiency. For example, FIG. 1A depicts an MU transmission that solicits an immediate acknowledgement from a station while FIG. 1B depicts an MU transmission that does not solicit an immediate response from any of the participating/target stations.

Figure 1A:
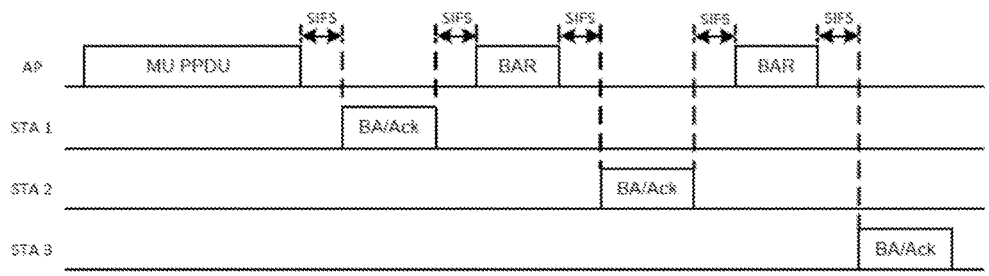
FIG. 1A depicts a multi-user (MU) transmission that solicits an immediate acknowledgement from one target station and delayed acknowledgements from other target stations according to one embodiment.
Figure 1B:
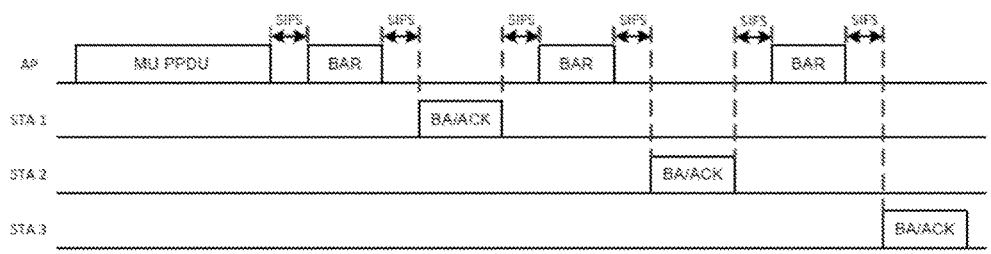
FIG. 1B depicts a MU transmission that solicits delayed acknowledgements from all target stations according to one embodiment.

In particular, as shown in FIG. 1A, an access point (AP) transmits a downlink (DL) MU physical layer convergence procedure (PLCP) protocol data unit (PPDU) to a set of stations (STAs) (i.e., addressed, target, or receiving STAs) on a shared wireless channel. The PPDU may identify a particular STA in the set of addressed STAs to send back an immediate acknowledgement on the shared wireless channel or a portion of the shared wireless channel (i.e., an implicit block acknowledgment request (BAR)). As used herein, an "immediate" response or acknowledgement refers to a transmission that is the next transmission on the shared wireless channel or a portion of the shared wireless channel after the DL PPDU. Accordingly, the immediate acknowledgment/response and the preceding transmission may be separated by a period during which no activity/transmission is occurring on the shared channel or a designated portion of the shared channel. For examples, as shown in FIG. 1A, the period between the DL PPDU/frame and the immediate acknowledgment may be a short interframe space (SIFS) period. However, in other embodiments, other IFS periods may be used. After receiving the acknowledgement frame from the specific STA for which an immediate response was requested, the AP polls acknowledgement frames from every other STA that the AP has sent the DL MU PPDU using a set of BAR frames (i.e., explicit BARs). Response to each corresponding BAR frame, as shown in the FIG. 1A, occur after an inactivity period on the channel and therefore would be considered immediate responses to the corresponding BAR frame.

Similarly, a DL MU transmission with no request for an immediate acknowledgement (i.e., no implicit BAR indication is present in the DL MU PPDU) requires the AP to poll each STA in the DL MU transmission for an acknowledgement that the DL MU PPDU was successfully received/processed. In particular, the AP may set an ACK Policy to be a block acknowledgement for every STA. As shown in FIG. 1B, after sending the DL MU PPDU, the AP polls acknowledgement frames from each STA addressed by the MU PPDU using corresponding BAR frames.

Therefore, for both of the mechanisms described above and shown in FIG. 1A and FIG. 1B, even though DL data frames are sent in parallel in the spatial domain (e.g., using OFDMA or MIMO techniques), the acknowledgement frames from multiple STAs are transmitted and received in a serial (i.e., SU) manner. In particular, one or more BAR frames must be transmitted from the AP to one or more respective STAs such that each STA may sequentially send a corresponding acknowledgement or block acknowledgment back to the AP. This serial acknowledgement scheme consumes/requires a considerable amount of overhead (e.g., the time the shared wireless channel is devoted to acknowledgement transmissions) and reduces the overall gain/efficiency of DL MU transmissions. This inefficient serial acknowledgement mechanism is unavoidable in wireless systems in which MU uplink (UL) transmissions are prohibited or otherwise are not supported. However, several techniques are presented herein that facilitate a MU UL transmission scheme for acknowledgements to reduce or eliminate the inefficiencies of serial acknowledgements.

As used herein and where appropriate, acknowledgment frames/PPDUs/messages may either be individual acknowledgments (ACKs) or block acknowledgements (BAs). As defined in IEEE 802.11e, BAs acknowledge the receipt of multiple MAC Protocol Data Units (MPDUs) whereas ACKs acknowledge receipt of a single MPDU.

Figure 2:
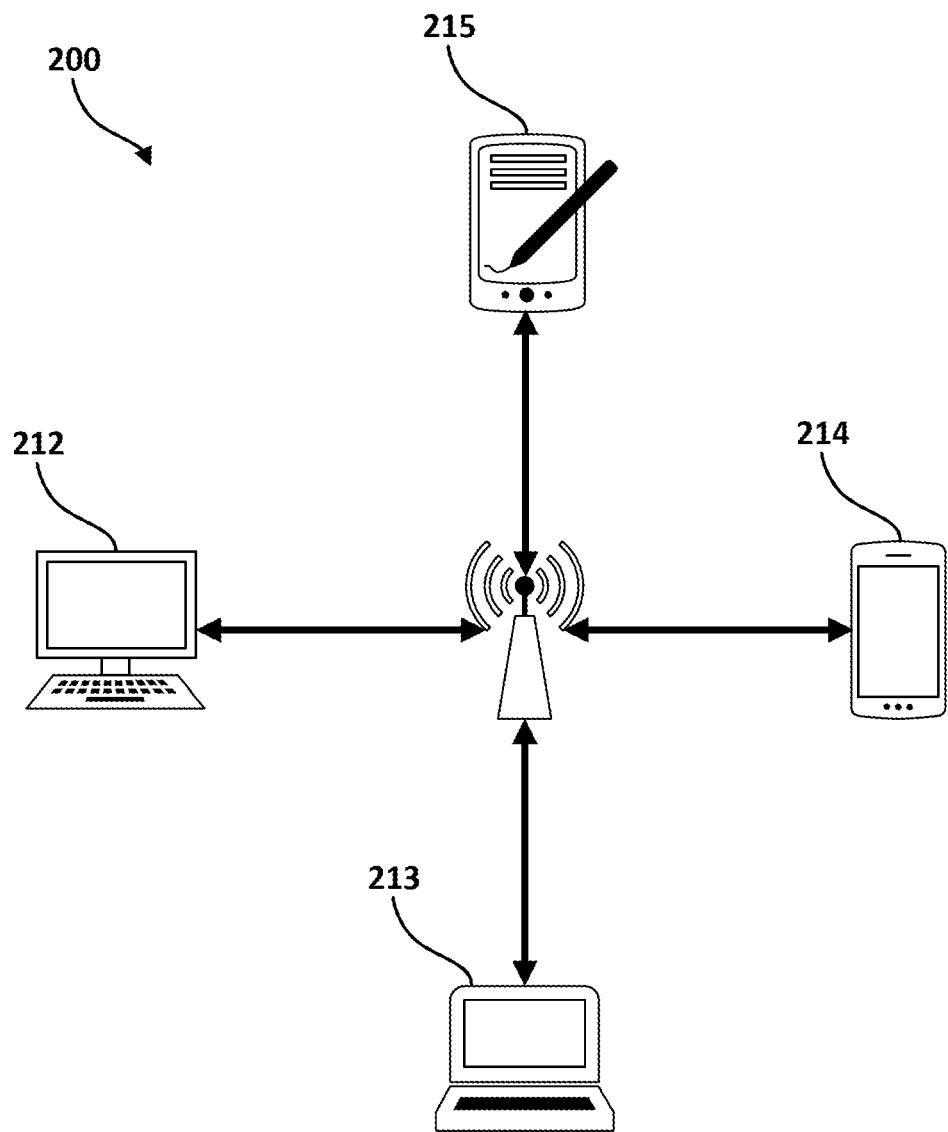
FIG. 2 illustrates a schematic diagram of an example of a wireless communication network according to one embodiment.

FIG. 2 illustrates a schematic diagram of an example of a wireless communication network 200 in which one or more of the methods, systems, and apparatuses described herein may operate or otherwise be implemented within. In the wireless communication network 200, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 200 includes wireless communication devices 211-215, which may be referred to as stations (STAs).

Each of the wireless communication devices 211-215 may include a media access control (MAC) layer and a physical (PHY) layer according to an IEEE 802.11 standard or a modification of an IEEE 802.11 standard. In the example network 200, at least one wireless communication device (e.g., device 211) is an access point (AP). An AP may be referred to as an AP STA, an AP device, or a central station. The other wireless communication devices (e.g., devices 212-215) may be non-AP STAs. Alternatively, all of the wireless communication devices 211-215 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the Internet for one or more STAs that are wirelessly and communicatively connected to the AP. In FIG. 2, wireless communications between non-AP STAs 212-215 are made by way of the AP 211. However, when a direct link is established between two or more non-AP STAs 212-215, the connected STAs 212-215 can communicate directly with each other (without using the AP 211).

In one or more implementations, OFDMA-based 802.11 technologies are utilized, and for the sake of brevity, a STA refers to a non-AP high efficiency (HE) STA, and an AP refers to an HE AP. In one or more aspects, a STA may act as an AP.

Figure 3:
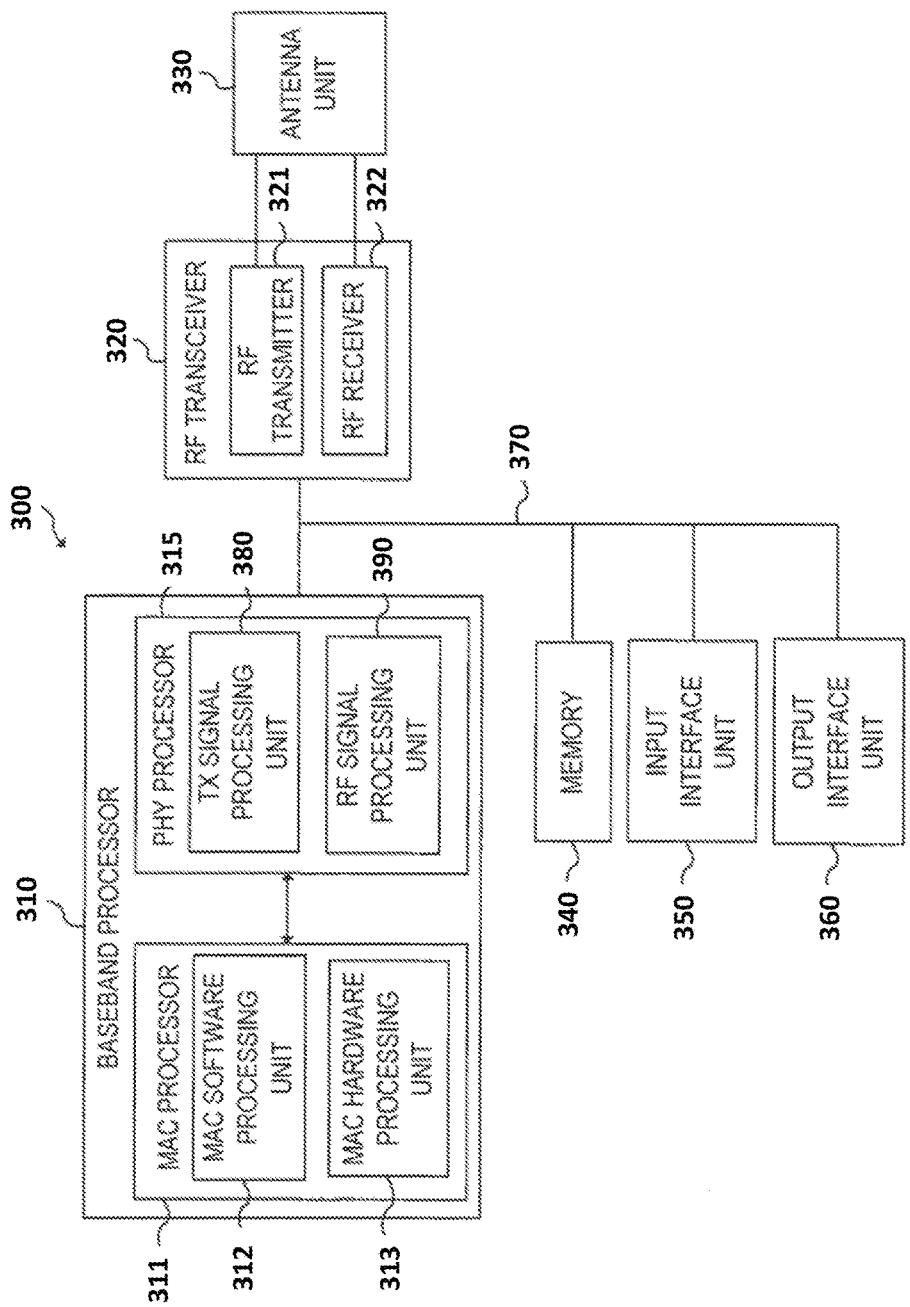
FIG. 3 illustrates a schematic diagram of an example of a wireless communication device according to one embodiment.

FIG. 3 illustrates a schematic diagram of an example of a wireless communication device 300. The wireless communication device 300 includes a baseband processor 310, a radio frequency (RF) transceiver 320, an antenna unit 330, a memory 340, an input interface unit 350, an output interface unit 360, and a bus 370, or subsets and variations thereof. The wireless communication device 300 can be, or can be a part of, any of the wireless communication devices 211-215.

In the example shown in FIG. 3, the baseband processor 310 performs baseband signal processing, and includes a medium access control (MAC) processor 311 and a PHY processor 315. The memory 340 may store software (such as MAC software) including at least some functions of the MAC layer. The memory 340 may further store an operating system and applications.

In the illustration, the MAC processor 311 includes a MAC software processing unit 312 and a MAC hardware processing unit 313. The MAC software processing unit 312 executes the MAC software to implement some functions of the MAC layer, and the MAC hardware processing unit 313 may implement remaining functions of the MAC layer as hardware (MAC hardware). However, the MAC processor 311 may vary in functionality depending on implementation. The PHY processor 315 includes a transmitting (TX) signal processing unit 380 and a receiving (RX) signal processing unit 390. The term TX may refer to transmitting, transmit, transmitted, transmitter or the like. The term RX may refer to receiving, receive, received, receiver or the like.

The PHY processor 315 interfaces to the MAC processor 311 through, among others, transmit vector (TXVECTOR) and receive vector (RXVECTOR) parameters. In one or more aspects, the MAC processor 311 generates and provides TXVECTOR parameters to the PHY processor 315 to supply per-packet transmit parameters. In one or more aspects, the PHY processor 315 generates and provides RXVECTOR parameters to the MAC processor 311 to inform the MAC processor 311 of the received packet parameters.

In some aspects, the wireless communication device 300 includes a read-only memory (ROM) (not shown) or registers (not shown) that store instructions that are needed by one or more of the MAC processor 311, the PHY processor 315 and/or other components of the wireless communication device 300.

In one or more implementations, the wireless communication device 300 includes a permanent storage device (not shown) configured as a read-and-write memory device. The permanent storage device may be a non-volatile memory unit that stores instructions even when the wireless communication device 300 is off. The ROM, registers, and the permanent storage device may be part of the baseband processor 310 or be a part of the memory 340. Each of the ROM, registers, the permanent storage device, and the memory 340 may be an example of a memory or a computer-readable medium. A memory may be one or more memories.

The memory 340 may be a read-and-write memory, a read-only memory, a volatile memory, a non-volatile memory, or a combination of some or all of the foregoing. The memory 340 may store instructions that one or more of the MAC processor 311, the PHY processor 315, and/or another component may need at runtime.

The RF transceiver 320 includes an RF transmitter 321 and an RF receiver 322. The input interface unit 350 receives information from a user, and the output interface unit 360 outputs information to the user. The antenna unit 330 includes one or more antennas. When multi-input multi-output (MIMO) or multi-user MIMO (MU-MIMO) is used, the antenna unit 330 may include more than one antenna.

The bus 370 collectively represents all system, peripheral, and chipset buses that communicatively connect the numerous internal components of the wireless communication device 300. In one or more implementations, the bus 370 communicatively connects the baseband processor 310 with the memory 340. From the memory 340, the baseband processor 310 may retrieve instructions to execute and data to process in order to execute the processes of the subject disclosure. The baseband processor 310 can be a single processor, multiple processors, or a multi-core processor in different implementations. The baseband processor 310, the memory 340, the input interface unit 350, and the output interface unit 360 may communicate with each other via the bus 370.

The bus 370 also connects to the input interface unit 350 and the output interface unit 360. The input interface unit 350 enables a user to communicate information and select commands to the wireless communication device 300. Input devices that may be used with the input interface unit 350 may include any acoustic, speech, visual, touch, tactile and/or sensory input device (e.g., a keyboard, a pointing device, a microphone, or a touchscreen). The output interface unit 360 may enable, for example, the display or output of videos, images, audio, and data generated by the wireless communication device 300. Output devices that may be used with the output interface unit 360 may include any visual, auditory, tactile, and/or sensory output device (e.g., printers and display devices or any other device for outputting information). One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device (e.g., RAM, ROM, PROM, EPROM, flash memory, registers, a hard disk, removable memory, or a remote storage device).

In one aspect, a computer-readable medium includes/comprises instructions stored therein. In one aspect, a computer-readable medium is encoded with instructions. In one aspect, instructions are executable by one or more processors (e.g., 310, 311, 312, 313, 315, 380, 390) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 310, 311, 312, 313, 315, 380, 390) may be coupled to one or more memories (e.g., one or more external memories such as the memory 340, one or more memories internal to the processor, one or more registers internal or external to the processor, or one or more remote memories outside of the device 300), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 310, 311, 312, 313, 315, 380, 390) is configured to cause one or more operations of the subject disclosure to occur. In one aspect, a processor is configured to cause an apparatus (e.g., a wireless communication device 300) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 310, 311, 312, 313, 315, 380, 390), the one or more processors cause one or more operations of the subject disclosure to occur or cause an apparatus (e.g., a wireless communication device 300) to perform operations or a method of the subject disclosure.

Figure 4A:
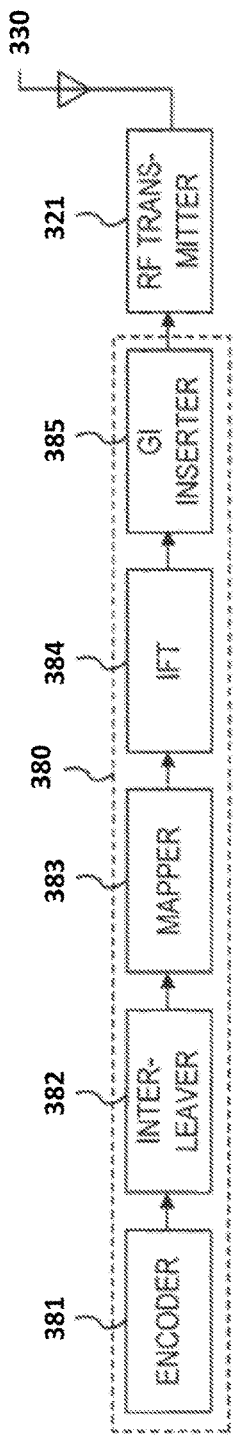
FIG. 4A illustrates a schematic block diagram of an example of a transmitting signal processor in a wireless communication device according to one embodiment.

FIG. 4A illustrates a schematic block diagram of an example of a transmitting signal processing unit 380 in a wireless communication device 300. The transmitting signal processing unit 380 of the PHY processor 315 includes an encoder 381, an interleaver 382, a mapper 383, an inverse Fourier transformer (IFT) 384, and a guard interval (GI) inserter 385.

The encoder 381 encodes input data. For example, the encoder 381 may be a forward error correction (FEC) encoder. The FEC encoder may include a binary convolutional code (BCC) encoder followed by a puncturing device, or may include a low-density parity-check (LDPC) encoder. The interleaver 382 interleaves the bits of each stream output from the encoder 381 to change the order of bits. In one aspect, interleaving may be applied only when BCC encoding is employed. The mapper 383 maps the sequence of bits output from the interleaver 382 into constellation points.

When MIMO or MU-MIMO is employed, the transmitting signal processing unit 380 may use multiple instances of the interleaver 382 and multiple instances of the mapper 383 corresponding to the number of spatial streams ($N_{SS}$). In the example, the transmitting signal processing unit 380 may further include a stream parser for dividing outputs of the BCC encoders or the LDPC encoder into blocks that are sent to different interleavers 382 or mappers 383. The transmitting signal processing unit 380 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 384 converts a block of the constellation points output from the mapper 383 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 384 may be provided for each transmit chain.

When MIMO or MU-MIMO is employed, the transmitting signal processing unit 380 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 385 prepends a GI to the symbol. The transmitting signal processing unit 380 may optionally perform windowing to smooth edges of each symbol after inserting the GI. The RF transmitter 321 converts the symbols into an RF signal and transmits the RF signal via the antenna unit 330. When MIMO or MU-MIMO is employed, the GI inserter 385 and the RF transmitter 321 may be provided for each transmit chain.

Figure 4B:
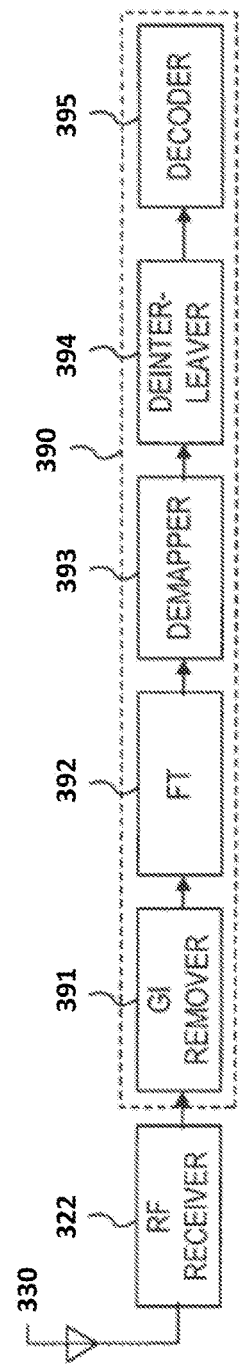
FIG. 4B illustrates a schematic block diagram of an example of a receiving signal processor in a wireless communication device according to one embodiment.

FIG. 4B illustrates a schematic block diagram of an example of a receiving signal processing unit 390 in a wireless communication device. The receiving signal processing unit 390 of the PHY processor 315 includes a GI remover 391, a Fourier transformer (FT) 392, a demapper 393, a deinterleaver 394, and a decoder 395.

The RF receiver 322 receives an RF signal via the antenna unit 330 and converts the RF signal into one or more symbols. In some aspects, the GI remover 391 removes the GI from the symbol. When MIMO or MU-MIMO is employed, the RF receiver 322 and the GI remover 391 may be provided for each receive chain.

The FT 392 converts the symbol (e.g., the time domain block) into a block of the constellation points by using a discrete Fourier transform (DFT) or a fast Fourier transform (FFT) depending on implementation. In one or more implementations, the FT 392 is provided for each receive chain.

When MIMO or MU-MIMO is employed, the receiving signal processing unit 390 may be a spatial demapper for converting the Fourier transformed receiver chains to constellation points of the space-time streams, and a STBC decoder (not shown) for despreading the constellation points from the space-time streams into the spatial streams.

The demapper 393 demaps the constellation points output from the FT 392 or the STBC decoder to the bit streams. If the LDPC encoding is used, the demapper 393 may further perform LDPC tone demapping before the constellation demapping. The deinterleaver 394 deinterleaves the bits of each stream output from the demapper 393. In one or more implementations, deinterleaving may be applied only when BCC encoding is used.

When MIMO or MU-MIMO is employed, the receiving signal processing unit 390 may use multiple instances on the demapper 393 and multiple instances of the deinterleaver 394 corresponding to the number of spatial streams. In the example, the receiving signal processing unit 390 may further include a stream deparser for combining the streams output from the deinterleavers 394.

The decoder 395 decodes the streams output from the deinterleaver 394 and/or the stream deparser. For example, the decoder 395 may be an FEC decoder. The FEC decoder may include a BCC decoder or an LDPC decoder.

Figure 4C:
FIG. 4C illustrates an example of a high efficiency (HE) frame according to one embodiment.

FIG. 4C illustrates an example of a high efficiency (HE) frame 400. The HE frame 400 is a physical layer convergence procedure (PLCP) protocol data unit (or PPDU) format. An HE frame may be referred to as an OFDMA frame, a PPDU, a PPDU format, an OFDMA PPDU, an MU PPDU, another similar term, or vice versa. An HE frame may be simply referred to as a frame for convenience. In one or more implementations, an AP may transmit a frame for downlink (DL) using a frame format shown in this figure or a variation thereof (e.g., without any or some portions of an HE header). A STA may transmit a frame for uplink (UL) using a frame format shown in this figure or a variation thereof (e.g., without any or some portions of an HE header).

Referring to FIG. 4C, the HE frame 400 contains a header and a data field. The header includes a legacy header comprised of a legacy short training field (L-STF), a legacy long training field (L-LTF), and a legacy signal (L-SIG) field. These legacy fields contain symbols based on an early design of an IEEE 802.11 specification. The L-STF, L-LTF, and L-SIG fields may be 8 μs, 8 μs, and 4 μs, respectively. Presence of these symbols would make any new design compatible with the legacy designs and products. The legacy header may be referred to as a legacy preamble. In one or more aspects, the term header may be referred to as a preamble.

In one or more implementations, the legacy STF, LTF, and SIG symbols are modulated/carried with FFT size of 64 on a 20 MHz sub-channel and are duplicated every 20 MHz if the frame has a channel bandwidth wider than 20 MHz. Therefore, the legacy field (i.e., the STF, LTF, and SIG fields) occupies the entire channel bandwidth of the frame. The L-STF field may be utilized for packet detection, automatic gain control (AGC), and coarse frequency-offset (FO) correction. In one aspect, the L-STF field does not utilize frequency domain processing (e.g., FFT processing) but rather utilizes time domain processing. Thus, in one aspect, the L-STF field is not affected by the channel dispersion. The L-LTF field may be utilized for channel estimation, fine frequency-offset correction, and symbol timing. The L-SIG field includes one orthogonal frequency division multiplexing (OFDM) symbol. Thus, in one aspect, the term L-SIG field may be used interchangeably with L-SIG symbol. In one or more aspects, the L-SIG field may contain information indicative of a data rate and a length (e.g., in bytes) associated with the HE frame 400, which may be utilized by a receiver of the HE frame 400 to calculate a time duration of a transmission of the HE frame 400.

The header may also include an HE header comprised of an HE-SIG-A field and an HE-SIG-B field. The HE-SIG-A field may sometimes be referred to simply as a SIG-A field. These fields contain symbols that carry control information that may be vital regarding each PLCP service data unit (PSDU) and regarding the radio frequency (RF), PHY, and MAC properties of a PPDU. Several sub-fields may be located either in the HE-SIG-A and/or HE-SIG-B fields. In one aspect, the HE-SIG-A field can be carried/modulated using an FFT size of 64. The HE-SIG-B field can be carried/modulated using an FFT size of e.g., 64 or 256 depending on implementation. The HE-SIG-A and HE-SIG-B fields may occupy the entire channel bandwidth of the frame. In some aspects, the size of the HE-SIG-A field and/or the HE-SIG-B field is variable. In other words, the number of symbols contained in the HE-SIG-A field and/or HE-SIG-B field can vary from frame to frame. An HE-SIG-B field is not always present in all frames. In some cases, single user (SU) packets and UL trigger-based packets do not contain the HE-SIG-B field. To facilitate decoding of the HE frame 400 by a receiver, the size of (e.g., number of symbols contained in) the HE-SIG-B field may be indicated in the HE-SIG-A field. In some aspects, the HE header also includes a repeated L-SIG (RL-SIG) field, whose content is the same as the L-SIG field.

For a 20 MHz channel, an FFT size of 64 is associated with a discrete Fourier transform (DFT) period of 3.2 μs and a subcarrier spacing of 312.5 kHz. For a 20 MHz channel, an FFT size of 256 is associated with a DFT period of 12.8 μs and a subcarrier spacing of 78.125 kHz. The DFT period may also be referred to as an inverse DFT period (IDFT) or an IDFT/DFT period. The DFT period may be denoted as $T_{DFT}$. The subcarrier spacing may be referred to as a subcarrier frequency spacing and may be denoted as $\Delta_F$. The DFT period may be obtained by dividing the channel bandwidth by the FFT size. The subcarrier spacing is the reciprocal of the DFT period.

The HE header may further include HE-STF and HE-LTF fields, which contain symbols used to perform necessary RF and PHY processing for each PSDU and/or for the whole PPDU. The HE-LTF symbols may be modulated/carried with an FFT size of 256 for 20 MHz bandwidth and modulated over the entire bandwidth of the frame. Thus, the HE-LTF field may occupy the entire channel bandwidth of the frame. The HE-STF symbols may have a fixed pattern and a fixed duration. For example, the HE-STF symbols may have a predetermined repeating pattern. In one aspect, the HE-STF symbols do not require FFT processing. The HE frame 400 may include the data field, represented as HE-DATA, that contains data symbols. The data field may also be referred to as a payload field, data, payload or PSDU.

In one or more aspects, additional one or more of the HE-STF and/or HE-LTF fields may be included in the header. For example, an additional HE-STF field and/or an additional HE-LTF field may be included between the HE-SIG-A field and the HE-SIG-B field. The additional HE-STF and HE-LTF fields may be, for example, modulated/carried with FFT size of 64 on a 20 MHz channel and may be included as part of the first part of the HE frame 400. In one or more implementations, a TX signal processing unit 380 (or an IFT 384) illustrated FIG. 4A may carry out the modulation described in this paragraph as well as the modulations described in other paragraphs above. In one or more implementations, an RX signal processing unit 390 (or an FT 392) may perform demodulation for a receiver.

Each of the fields (e.g., L-LTF, HE-SIG-B, etc.) of the HE frame 400 includes one or more guard intervals and one or more OFDM symbols. The guard interval may be utilized to facilitate compensation of multi-path effects, which may cause inter-symbol interference (ISI). In one or more implementations, a guard interval is a cyclic prefix (CP), and a guard interval duration is a CP length. In one or more aspects, the term duration may be referred to as a length. In one aspect, no guard interval is used for symbols in the L-STF field and/or HE-STF field. Each guard interval may be associated with a symbol and may be present between symbols (or between consecutive symbols). In some aspects, each OFDM symbol is preceded (or followed) by a guard interval. In some aspects, the OFDM symbol may be referred to as including the guard interval that precedes (or follows) the OFDM symbol.

In one or more implementations of a transmitter, a GI inserter 385 illustrated in FIG. 4A may prepend a guard interval to an OFDM symbol. For a receiver, a GI remover 391 of FIG. 4B may remove the prepended guard interval.

Figure 5A:
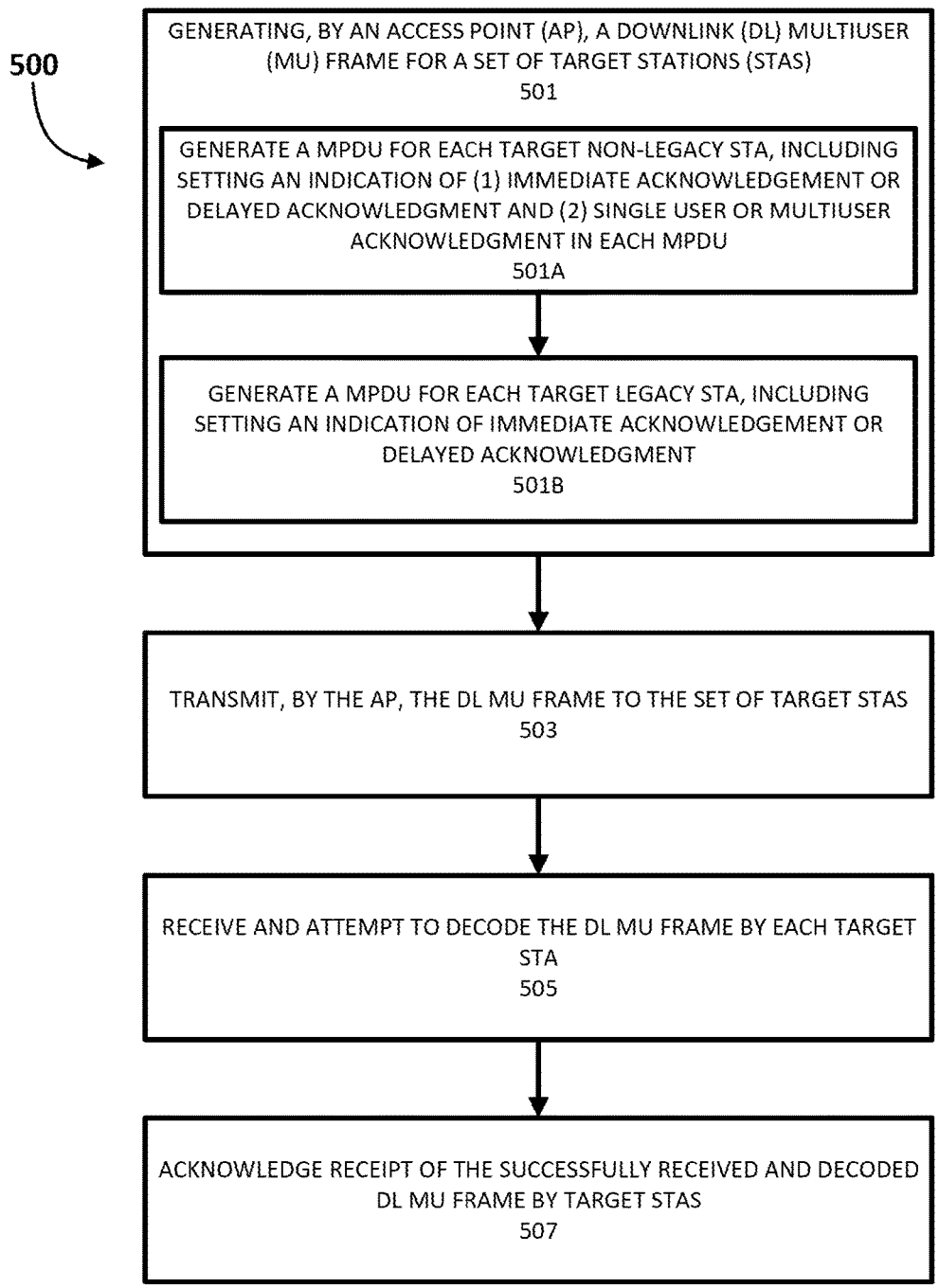
FIG. 5A illustrates a method for coordinating an uplink (UL) MU acknowledgement/response transmission to a downlink (DL) MU transmission according to a first embodiment.

Turning now to FIG. 5A, a method 500 will be described for coordinating UL MU acknowledgement/response transmissions to a DL MU transmission according to one embodiment. As will explained in further detail below, the proposed method 500 facilitates UL MU acknowledgement/response transmissions for more advanced STAs (e.g., HE STAs), which support UL MU capabilities (e.g., UL OFDMA or UL MU-MIMO), while still being backwards compatible with legacy devices (e.g., High Throughput (HT) STAs, Very High Throughput (VHT) STAs, or other devices that do not support UL MU transmissions).

The method 500 may be performed by one or more devices in the network 200. For example, one or more operations or sub-operations of the method 500 may be performed by the device 211, which is operating as an AP in the network 200, and/or the device 212-215. In particular, in the method 500 the AP 211 may be in communication with two or more of the device 212-215, which operate as separate STAs in the network 200. In this configuration, the AP 211 and the STAs 212-215 may jointly performed the method 500 to efficiently acknowledge receipt of a DL MU PPDU/frame.

Figure 5B:
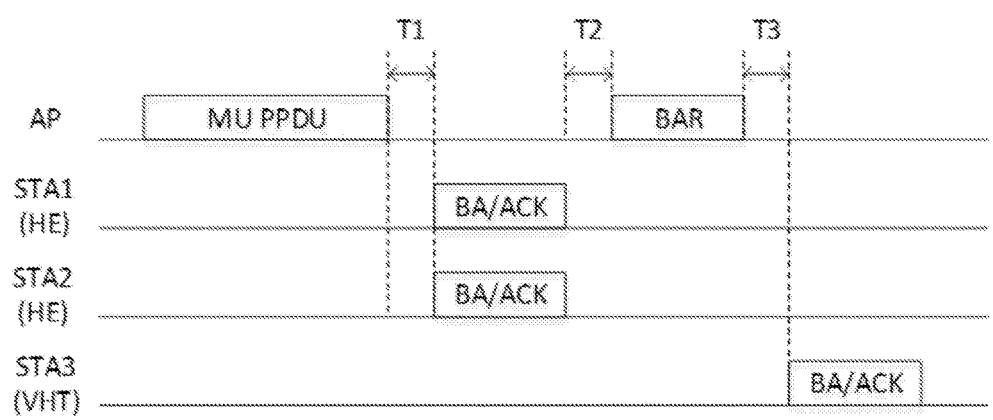
FIG. 5B illustrates a transmission diagram for coordinating an UL MU acknowledgement/response transmission according to the first embodiment.

Each operation of the method 500 will be described by way of example below in relation to the transmission diagram shown in FIG. 5B. Although one or more operations or sub-operations are described or shown in a particular sequential order, in other embodiments the operations/sub-operations may be rearranged in a different order, which may include performance of multiple operations/sub-operations in at least partially overlapping time periods.

The method 500 may commence at operation 501 with the generation of a DL MU PPDU/frame by an AP. The DL MU frame may be addressed to a set of target STAs operating in a network. For example, as shown in FIG. 5B, the DL MU frame may be addressed to STA1, STA2, and STA3. In this example, STA1 and STA2 are non-legacy devices that support UL MU transmissions and STA3 is a legacy device that does not support UL MU transmissions. For example, STA1 and STA2 may be HE devices (i.e., devices that operate according to the IEEE 802.11ax standard, which is currently in development) and STA3 may be a VHT STA (i.e., a device that operates according to the IEEE 802.11ac standard), a HT STA (i.e., a device that operates according to the IEEE 802.11n standard), or another device that operates according to a wireless standard that does not support UL MU transmissions. The generated DL MU frame may be a MU-MIMO frame and/or an OFDMA frame. The generation of the frame at operation 501 may include the sub-operations described below.

At sub-operation 501A the AP may generate one or more MAC Protocol Data Units (MPDUs) or aggregated-MPDUs (A-MPDUs) for each non-legacy STA. In the example, one or more MPDUs/A-MPDUs may be generated for STA1 and one or more MPDUs/A-MPDUs may be generated for STA2. Each MPDU may include data and/or control frames intended for each respective STA and may be placed in resource units within the DL MU frame assigned/allocated to each respective STA. The resource units may be particular spatial streams or sub-channels of a wireless channel upon which the DL MU frame will be transmitted.

In one embodiment, one or more MPDUs may include acknowledgement information that is used for indicating to respective STAs a scheme/technique used to transmit acknowledgement messages to the AP. For example, in one embodiment, generation of one or more MPDUs addressed to each STA may include setting an acknowledgement policy subfield (ACK policy subfield) in a header of the one or more MPDUs (i.e., a MAC header) such that STA1 and STA2 can identify which technique/scheme is to be used by each non-legacy STA for acknowledging successful receipt of the MPDUs by each respective STA. In one embodiment, the ACK policy subfield is two bits and is located in the Quality of Service (QoS) Control Field of the MAC header. However, in other embodiments, the ACK policy subfield may be located in different portions of the MAC header and may be of a different length (e.g., 1 bit, 3 bits, etc.).

In embodiments in which the ACK Policy subfield is two bits in length, the interpretation of these two bits may be given by Table 1 below.

TABLE 1

| Bits in QoS Control field | | Meaning |
|---|---|---|
| Bit 5 | Bit 6 | |
| 0 | 0 | Normal Ack or Implicit Block Ack Request. In a frame that is a non-A-MPDU frame or VHT single MPDU: The addressed recipient returns an Ack or QoS +CF-Ack frame after a short interframe space (SIFS) period, according to the procedures defined in 9.3.2.9 (Ack procedure) and 9.22.3.5 (HCCA transfer rules) A non-DMG STA sets the Ack Policy subfield for individually addressed QoS Null (no data) frames to this value. Otherwise: The addressed recipient returns a BlockAck frame, either individually or as part of an A-MPDU starting a SIFS after the PPDU carrying the frame, according to the procedures defined in 9.3.2.10 (Block ack procedure), 9.24.7.5 (Generation and transmission of BlockAck frames by an HT STA or DMG STA), 9.24.8.3 (Operation of HT-delayed block ack), 9.28.3 (Rules for RD initiator), 9.28.4 (Rules for RD responder), and 9.32.3 (Explicit feedback beamforming). |
| 1 | 0 | No Ack The addressed recipient takes no action upon receipt of the frame. More details are provided in 9.25 (No Acknowledgment (No Ack)). The Ack Policy subfield is set to this value in all individually addressed frames in which the sender does not require acknowledgment. The Ack Policy subfield is also set to this value in all group addressed frames that use the QoS frame format except with a TID for which a block ack agreement exists. This value of the Ack Policy subfield is not used for QoS Data frames with a TID for which a block ack agreement exists. The Ack Policy subfield for group addressed QoS Null (no data) frames is set to this value. |
| 0 | 1 | No explicit acknowledgment or PSMP Ack. When bit 6 of the Frame Control field (see 8.2.4.1.3 (Type and Subtype fields)) is set to 1: There may be a response frame to the frame that is received, but it is neither the Ack frame nor any Data frame of subtype +CF-Ack. The Ack Policy subfield for QoS CF-Poll and QoS CF-Ack +CF-Poll Data frames is set to this value. |

TABLE 1-continued

Bits in QoS Control field

Bit 5  Bit 6  Meaning

|  |  |  |
|---|---|---|
|  |  | When bit 6 of the Frame Control field (see 8.2.4.1.3 (Type and Subtype fields)) is set to 0: The acknowledgment for a frame indicating PSMP Ack when it appears in a PSMP downlink trasmission time (PSMP-DTT) is to be received in a later PSMP uplink transmission time (PSMP-UTT). The acknowledgment for a frame indicating PSMP Ack when it appears in a PSMP-UTT is to be received in a later PSMP-DTT. NOTE-Bit 6 of the Frame Control field (see 8.2.4.1.3 (Type and Subtype fields)) indicates the absence of a data payload. When equal to 1, the QoS Data frame contains no payload, and any response is generated in response to a QoS CF-Poll or QoS CF-Ack +CF-Poll frame, but does not signify an acknowledgment of data. When set to 0, the QoS Data frame contains a payload, which is acknowledged as described in 9.29.2.7 (PSMP acknowledgment rules). |
| 1 | 1 | Block Ack The addressed recipient takes no action upon the receipt of the frame except for recording the state. The recipient can expect a BlockAckReq frame in the future to which it responds using the procedure described in 9.24 (Block acknowledgment (block ack)). |

In some embodiments, when the ACK Policy subfield is set to indicate an immediate acknowledgement, which in Table 1 above corresponds to "Normal Ack or Implicit Block Ack Request" and a bit sequence "00", another subfield (a second subfield or a MU ACK Policy subfield) indicates if the follow-up acknowledgement shall be a single user (SU) acknowledgement or an MU acknowledgement. Therefore, the MU acknowledgement that follows immediately after the DL MU PPDU transmission happens from those STAs for which the ACK Policy subfield is set to an immediate acknowledgement and the MU ACK Policy subfield is set to an MU acknowledgement. For example, both STA1 and STA2 in FIG. 5B received MPDUs in which the ACK Policy subfield is set to an immediate acknowledgment (e.g., "00") and the MU ACK Policy subfield is set to "MU acknowledgement". Accordingly, both STA1 and STA2 may participate in an UL MU acknowledgement immediately following the DL MU transmission. Both the DL and UL MU transmissions may be an OFDMA transmission and/or may incorporate MU-MIMO techniques.

Conversely, those STAs that the ACK Policy subfield is set to immediate acknowledgement and the MU ACK Policy subfield is not set to "MU acknowledgement" and instead is set to "SU acknowledgement", or cannot interpret the MU ACK Policy subfield, will send acknowledgement frames in single user transmission manner as shown in the examples in FIG. 1A and FIG. 1B. For example, a STA may transmit an acknowledgment or a block acknowledgement in an SU manner immediately after the DL MU transmission or may wait for a BAR frame from the AP before transmitting an acknowledgment or a block acknowledgement in an SU manner.

In one embodiment, the QoS AP PS Buffer State subfield in the QoS Control field is used as the MU ACK Policy subfield. In particular, in one embodiment, the $8^{th}$ bit (B8) of the QoS AP PS Buffer State subfield is used as the MU ACK Policy subfield. In one embodiment, if the MU ACK Policy subfield is set to a MU acknowledgement state, there is a second part in the DL MU PPDU that indicates (1) UL MU transmission method/scheme (e.g., MU-MIMO and/or OFDMA) and/or (2) resource allocation information for the MU acknowledgement frame transmission. In another embodiment, if the MU ACK Policy subfield is set to a MU acknowledgement state, resource allocation information regarding the UL MU transmission follows a pre-determined rule set and no explicit indication of the resource allocation information regarding UL MU transmission is included in the DL MU PPDU.

At sub-operation 501B, the AP may generate MPDUs for legacy STAs (e.g., VHT STAs, HT STAs, or any STA implementing a protocol that does not support UL MU transmissions). Similar to operation 501A for non-legacy STAs, operation 501B may include setting an ACK Policy subfield in a QoS Control Field of a MAC header. In one embodiment, the ACK Policy subfield for legacy STAs may be set to a state that indicates non-immediate acknowledgement, which in Table 1 above corresponds to "Block Ack". In particular, as shown in FIG. 5B, when "Block Ack" is selected, the AP may subsequently transmit a BAR frame to trigger STA3 to transmit an acknowledgment or a block acknowledgement in an SU manner. In another embodiment, the ACK Policy subfield for a legacy STA may be set to an immediate acknowledgement. In this embodiment, the ACK Policy subfield for all other scheduled STAs, including STAs that support UL MU transmissions, is to be a non-immediate acknowledgement. For example, STAs that are set to transmit a non-immediate MU acknowledgement will wait for a MU-BAR (i.e., a trigger frame) before transmitting.

Following generation of the DL MU frame/PPDU at operation 501, the method 500 may move to operation 503. At operation 503 the AP transmits the DL MU frame/PPDU to the addressed/targeted STAs. For example, as shown in FIG. 5B, the DL MU PPDU may be transmitted to the non-legacy STA1 and STA2 and the legacy STA3. As noted above, the DL MU PPDU may utilize OFDMA and/or MIMO MU transmission techniques.

At operation 505 each STA addressed by the DL MU PPDU may receive and attempt to decode the DL MU PPDU. In particular, each targeted STA receives the DL MU PPDU and determines resource units or particular portions of the frame assigned to the STA by examining the preamble portion of the DL MU PPDU/frame. Further, the target STAs may examine decoded MPDUs to determine acknowledgement scheme information/properties/characteristics including (1) whether acknowledgement of the DL MU frame is immediate or non-immediate, (2) whether the acknowledgement is multi-user or single user, and/or (3) scheduling information (e.g., a resource unit within a UL transmission) when a multi-user acknowledgement is selected.

At operation 507, the STAs that successfully received and decoded the appropriate portions of the DL MU PPDU may acknowledge receipt through the generation and the transmission of acknowledgement frames by each respective STA according to the acknowledgement information extracted from the DL frame. Acknowledgment may be performed after a predetermined period has elapsed since receipt of the DL frame (e.g., a short interframe space (SIFS) period or another interframe space (IFS) period). As described above, non-legacy STAs may examine the ACK policy subfield and the MU ACK policy subfield in the corresponding MPDU to determine the acknowledgement scheme the STA should use. For example, as shown in FIG. 5B and described above, ACK policy and the MU ACK policy subfields for STA1 and STA2 indicate that these devices are to participate in an immediate MU acknowledgement while STA3 is to perform a non-immediate (i.e., triggered by a BAR frame) SU acknowledgement. On this basis, STA1 and STA2 may participate in the transmission of a MU acknowledgement while STA3 may await a BAR frame before transmitting a SU acknowledgement. The UL MU transmission may be an OFDMA transmission and/or may incorporate MU-MIMO techniques.

As described above, the method 500 allows non-legacy devices to acknowledge receipt of a DL PPDU in an efficient manner through the use of UL MU techniques while remaining backwards compatible with legacy devices.

Figure 6A:
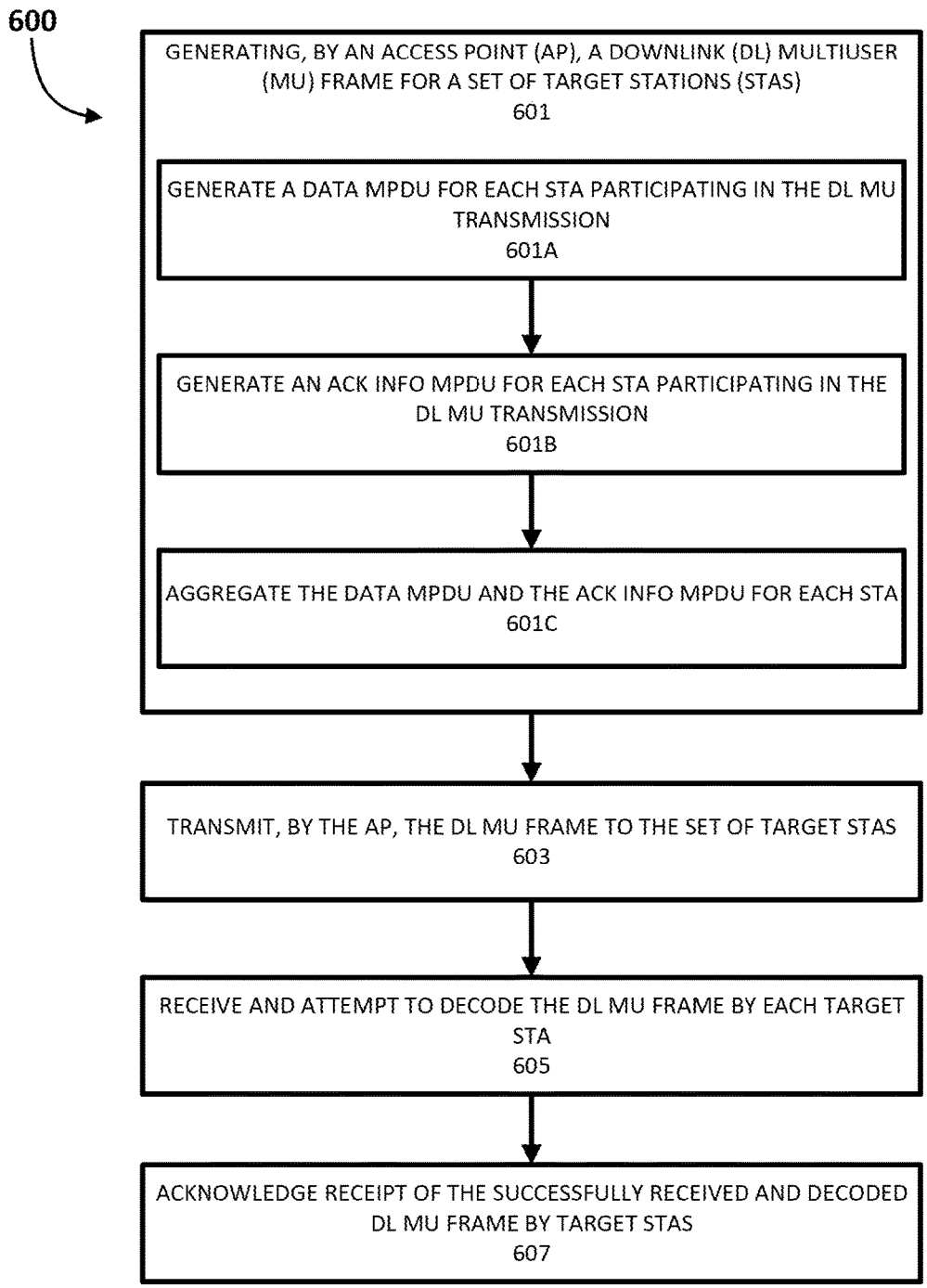
FIG. 6A illustrates a method for coordinating an UL MU acknowledgement/response transmission to a DL MU transmission according to a second embodiment.

Turning now to FIG. 6A, a method 600 will be described for coordinating UL MU acknowledgement/response transmissions to a DL MU transmission according to another embodiment. As will explained in further detail below, the proposed method 600 facilitates UL MU acknowledgement/response transmissions for more advanced STAs (e.g., HE STAs), which support UL MU capabilities (e.g., UL OFDMA or UL MU-MIMO).

Similar to the method 500, the method 600 may be performed by one or more devices in the network 200. For example, one or more operations or sub-operations of the method 600 may be performed by the device 211, which is operating as an AP in the network 200, and/or the devices 212-215, which are operating as STAs in the network 200.

Figure 6B:
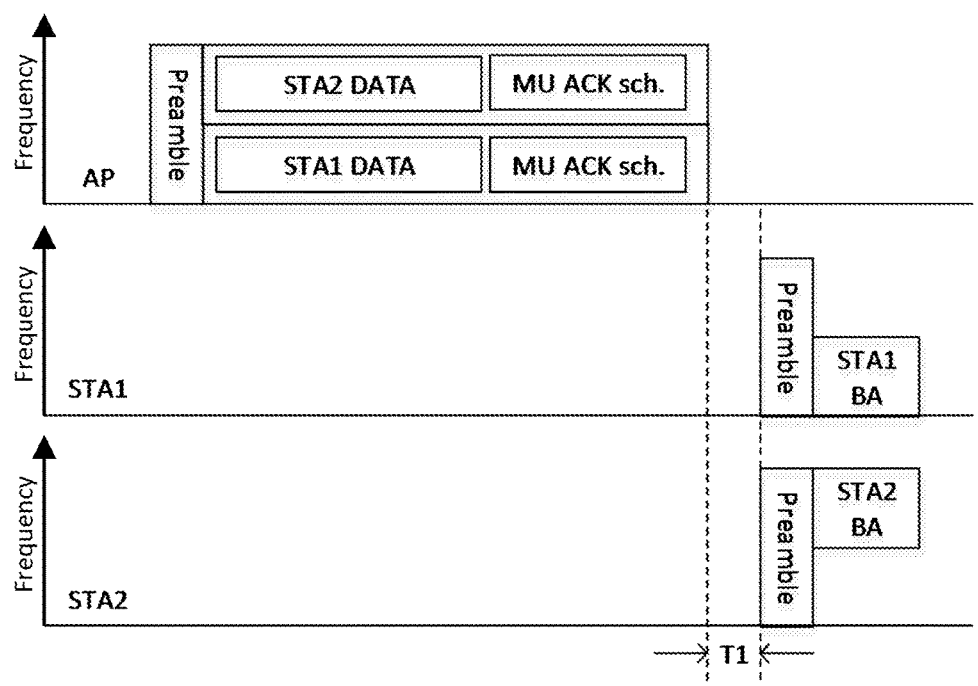
FIG. 6B illustrates a transmission diagram for coordinating an UL MU acknowledgement/response transmission according to the second embodiment.

Each operation of the method 600 will be described by way of example below in relation to the transmission diagram shown in FIG. 6B. Although one or more operations or sub-operations are described or shown in a particular sequential order, in other embodiments the operations/sub-operations may be rearranged in a different order, which may include performance of multiple operations in at least partially overlapping time periods.

The method 600 may commence at operation 601 with the generation of a DL MU frame by an AP. The DL MU frame may be addressed to a set of STAs operating in a network. For example, as shown in FIG. 6B, the DL MU frame may be addressed to STA1 and STA2. In this example, the AP schedules STA1 and STA2 for a DL OFDMA transmission, wherein STA1 is allocated a lower half of the transmission bandwidth and STA2 is allocated an upper half of the transmission bandwidth. In this example, STA1 and STA2 are HE STAs or other devices that support UL MU transmissions. Although shown as an OFDMA frame/PPDU, the generated DL MU frame may be a MU-MIMO frame/PPDU. The generation of the frame at operation 601 may include the sub-operations described below.

At sub-operation 601A, the AP may generate a data MPDU for each STA participating in the DL MU transmission. For example, as shown in FIG. 6B, the DL MU PPDU/frame may include a data MPDU for STA1 and a data MPDU for STA2. The data MPDU may include any type of data (e.g., voice, video, best effort, background, or control data) that is specifically intended for the particular STA and may be placed in resource units within the DL MU frame assigned/allocated to each respective STA. The resource units may be particular spatial streams or sub-channels of a wireless channel upon which the DL MU frame will be transmitted. In one embodiment, the generation of the data MPDU at sub-operation 601A may include setting acknowledgment information in a header of the MPDU (e.g., the MAC header of the data MPDU). The acknowledgment information may describe/indicate properties of an acknowledgement technique/scheme used by the corresponding STA to acknowledge receipt of the MPDU. For example, the acknowledgment information may include an ACK Policy subfield and/or a MU ACK Policy subfield. As noted above in relation to the method 500, the ACK Policy subfield may indicate whether the acknowledgement is immediate or non-immediate (e.g., corresponding to values represented in Table 1) and the MU ACK Policy subfield may indicate whether the acknowledgment is MU or SU. In some embodiments, the MU ACK Policy subfield is optional in the data MPDU.

At sub-operation 601B, the AP may generate an ACK Info MPDU for each STA participating in the DL MU transmission that includes additional acknowledgement information. For example, the DL MU PPDU/frame may include an ACK Info MPDU for STA1 and an ACK Info MPDU for STA2 as both of these stations are participating in the UL MU acknowledgment transmission. The ACK Info MPDU further describes/indicates acknowledgement technique/scheme and other information/properties/characteristics (in addition to the acknowledgment information in the data MPDU) needed for each respective STA to acknowledge successful receipt of the DL MU transmission. For example, each ACK Info MPDU may indicate whether the acknowledgement is (1) immediate or non-immediate, (2) multi-user or single user, and/or (3) scheduling information (e.g., a resource unit within a UL transmission) when a multi-user acknowledgement is selected as shown in FIG. 6B. For instance, in some embodiments the ACK Info MPDU may only be present when the MU ACK Info subfield of the corresponding data MPDU is set to indicate a MU UL acknowledgment. In another example embodiment, the data MPDU does not include acknowledgment information and all acknowledgment information is included in the ACK Info MPDU. In still another example embodiment, the data MPDU includes an ACK Policy subfield and this subfield is interpreted by STAs to indicate immediate/non-immediate and MU/SU acknowledgment. In this embodiment, the ACK Info MPDU includes scheduling/trigger information when an MU acknowledgment is scheduled. As legacy STAs cannot participate in UL MU transmissions, legacy STAs will be assigned SU acknowledgements, while non-legacy STAs (i.e., STAs that support UL MU transmissions) can be assigned MU acknowledgements.

In one embodiment, the scheduling information for the UL MU acknowledgement frame transmission includes common information and a per-STA information. The common information is information that is the same for every STA in the UL MU acknowledgement frame transmission and the per-STA information is specific resource allocation for each STA. Thus, different STAs scheduled in the same DL MU PPDU have different per-STA information while each STA has the same common information.

In some embodiments, the data MPDU and ACK Info MPDU for each STA may be aggregated into an A-MPDU at operation 601C. Accordingly, the DL MU transmission includes a single A-MPDU for each STA that includes both data and acknowledgement scheduling information. In some embodiments, the ACK Info MPDU is the first MPDU in each A-MPDU while in other embodiments ACK Info MPDU is in another position in each A-MPDU, such as the last MPDU in each A-MPDU.

Although described and shown as including a single data MPDU, in other embodiments, each A-MPDU may include one or more data MPDUs. Further, in some embodiments, each STA may receive multiple A-MPDUs in a single DL MU frame/PPDU.

Following generation of the DL MU frame/PPDU at operation 601, the method 600 may move to operation 603. At operation 603, the AP transmits the DL MU frame/PPDU to the addressed/target STAs. For example, as shown in FIG. 6B, the DL MU PPDU may be sent to the non-legacy STA1 and STA2. As noted above, the DL MU PPDU may utilize OFDMA and/or MIMO MU transmission techniques.

At operation 605, each STA addressed by the DL MU PPDU may receive and attempt to decode the DL MU PPDU. In particular, each targeted STA receives the DL MU PPDU and checks the preamble portion of the frame. In some embodiments, the preamble portion of the frame indicates the allocated resource for each target receiver in the MU transmission. Each target STA may thereafter decode the PPDU/resource unit that is allocated to that particular STA, including the data MPDU and the ACK Info MPDU. Based on the ACK Info MPDUs and/or the header of the data MPDUs, each STA can identify the type of acknowledgement transmission that is to be employed (e.g., MU or SU and immediate or non-immediate) and resource assignment when a MU transmission is indicated.

At operation 607, the STAs that successfully received and decoded the appropriate portions of the DL MU PPDU may acknowledge receipt through the generation and the transmission of acknowledgement frames by each respective STA according to the acknowledgement information extracted from the DL frame. Acknowledgment may be performed after a predetermined period has elapsed since receipt of the DL frame (e.g., a short interframe space (SIFS) period or another interframe space (IFS) period). In one example shown in FIG. 6B, STA1 and STA2 may participate in an UL MU acknowledgement based on scheduling information included in each respective ACK Info MPDU. As shown, STA1 is allocated the lower half of an UL OFDMA frame while STA2 is allocated the upper half of the UL OFDMA frame to carry an acknowledgement (e.g., a BA/ACK).

Figure 7A:
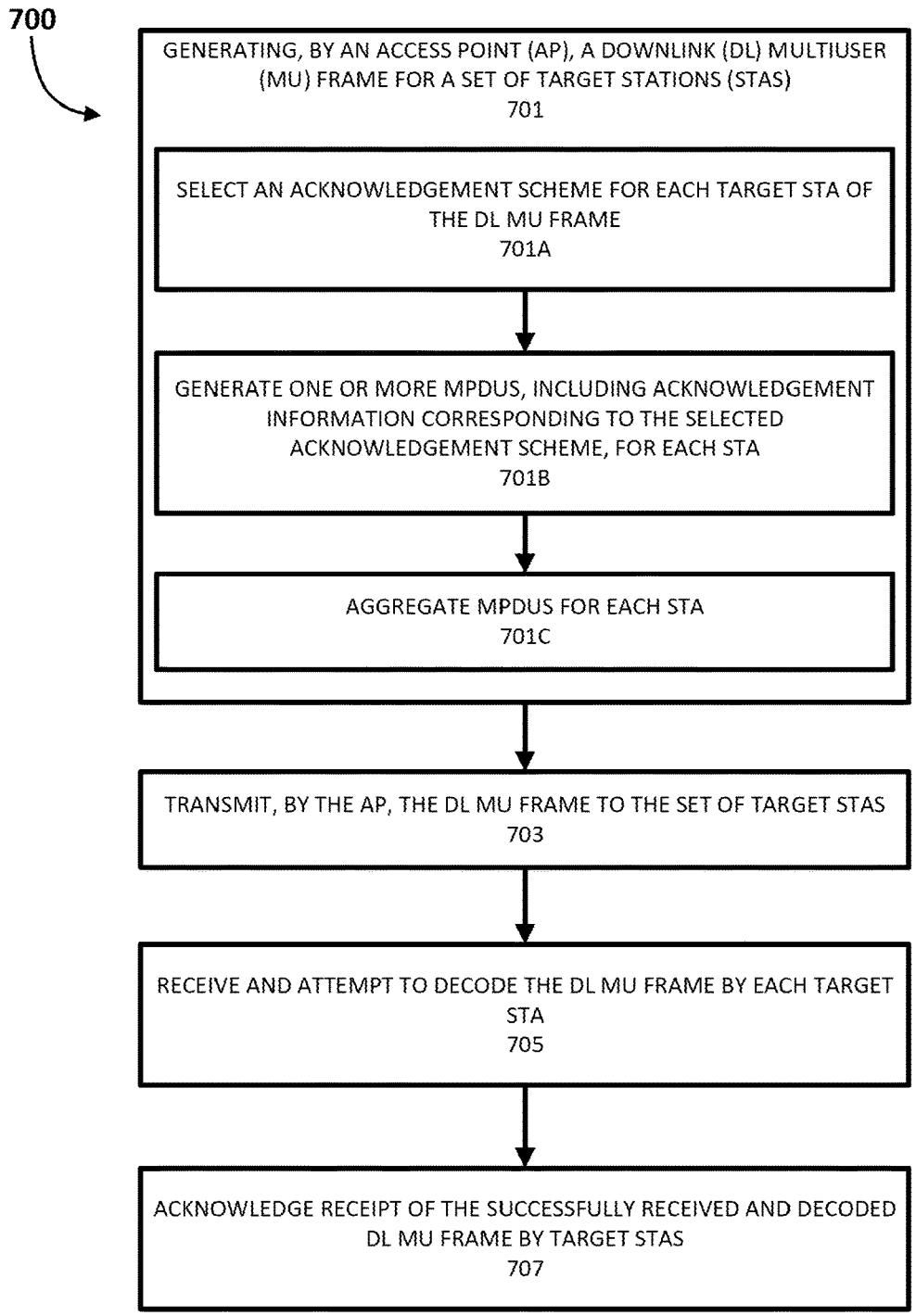
FIG. 7A illustrates a method for coordinating an UL MU acknowledgement/response transmission to a DL MU transmission according to a third embodiment.

Turning now to FIG. 7A, a method 700 will be described for coordinating UL MU acknowledgement/response transmissions to a DL MU transmission according to another embodiment. As will explained in further detail below, the proposed method 700 facilitates UL MU acknowledgement/response transmissions for more advanced STAs (e.g., HE STAs), which support UL MU capabilities (e.g., UL OFDMA or UL MU-MIMO).

Similar to the methods 500 and 600, the method 700 may be performed by one or more devices in the network 200. For example, one or more operations or sub-operations of the method 700 may be performed by the device 211, which is operating as an AP in the network 200, and/or the devices 212-215, which are operating as STAs in the network 200. Each operation of the method 700 will be described by way of example below in relation to the transmission diagram shown in FIG. 7B. Although one or more operations or sub-operations are described or shown in a particular sequential order, in other embodiments the operations/sub-operations may be rearranged in a different order, which may include performance of multiple operations in at least partially overlapping time periods.

Figure 7B:
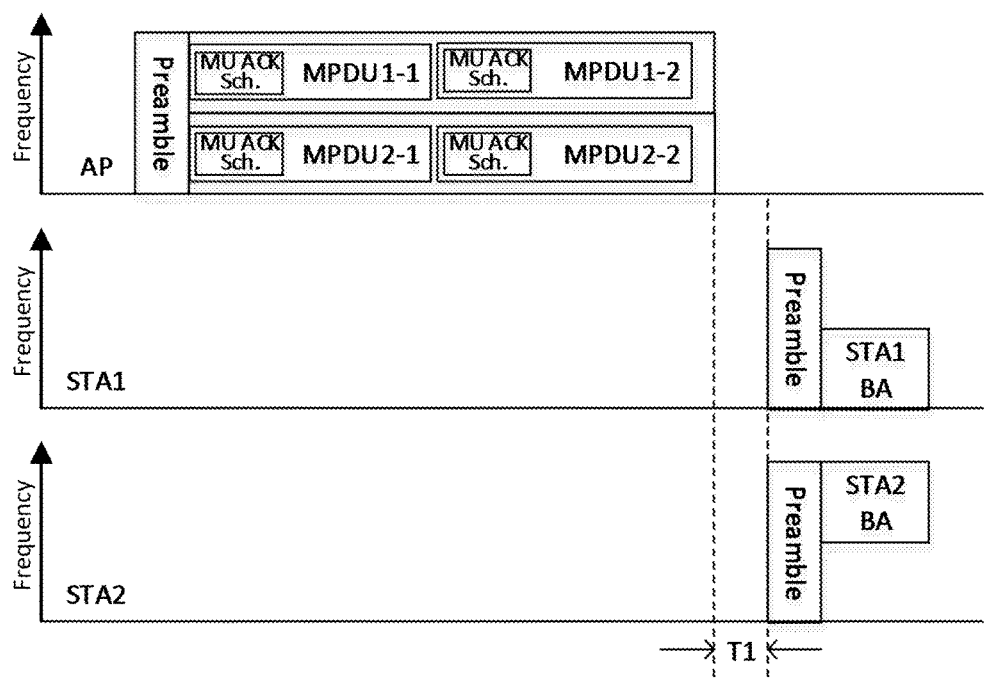
FIG. 7B illustrates a transmission diagram for coordinating an UL MU acknowledgement/response transmission according to the third embodiment.

The method 700 may commence at operation 701 with the generation of a DL MU frame by an AP. The DL MU frame may be addressed to a set of STAs operating in a network. For example, as shown in FIG. 7B, the DL MU frame may be addressed to STA1 and STA2. In this example, the AP schedules a DL OFDMA transmission to STA1 and STA2, wherein STA1 is allocated a lower half of the transmission bandwidth and STA2 is allocated an upper half of the transmission bandwidth. In this example, STA1 and STA2 are HE STAs or other devices that support UL MU transmissions. Although shown as an OFDMA frame/PPDU, the generated DL MU frame may be a MU-MIMO frame/PPDU. The generation of the frame at operation 701 may include the sub-operations described below.

At sub-operation 701A the AP may select/set an acknowledgement scheme for each target STA of the DL MU frame. For instance, in the example shown in FIG. 7B, an acknowledgement scheme may be selected for both STA1 and STA2 at sub-operation 701A. This information/properties/characteristics may indicate (1) whether the acknowledgement is immediate or non-immediate, (2) whether the acknowledgement is multi-user or single user, and/or (3) scheduling information (e.g., a resource unit within a UL transmission) when a multi-user acknowledgement is selected.

In one embodiment, the scheduling information for the UL MU acknowledgement frame transmission includes common information and a per-STA information. The common information is information that is the same for every STA in the UL MU acknowledgement frame transmission and the per-STA information is specific resource allocation for each STA. Thus, different STAs scheduled in the same DL MU PPDU have different per-STA information while each STA has the same common information.

However, in some embodiments, a distinction or division between common and per user information is not made. Since the acknowledgment/scheduling information is included in the header of the corresponding MPDU, it is understood that this information is intended for a specific STA.

Following selection of an acknowledgement scheme for each target STA, sub-operation 701B may generate one or more MPDUs for each target STA and may place each MPDU in resource units within the DL MU frame assigned/allocated to each respective STA. The resource units may be particular spatial streams or sub-channels of a wireless channel upon which the DL MU frame will be transmitted. For example, as shown in FIG. 7B, one or more MPDUs may be generated for STA1 and one or more MPDUs may be generated for STA2. At least one MPDU for each target STA may include corresponding (1) information indicating the acknowledgment scheme selected for each corresponding STA and (2) data (e.g., voice, video, best effort, background, or control data) that is specifically intended for the particular STA. In some embodiments, each MPDU for a particular STA may include the acknowledgment scheme information along with data.

In one embodiment, information indicating the acknowledgment scheme/information selected for each corresponding STA may be located in a header of each or at least one MPDU (e.g., a MAC header) and data may be located in a payload of the MPDU (e.g., MAC payload).

Using the above indications, since legacy STAs cannot participate in UL MU acknowledgement transmissions, legacy STAs may be assigned SU acknowledgements while non-legacy STAs may be assigned MU acknowledgements.

In some embodiments, the MPDUs for each STA may be separately aggregated into one or more A-MPDUs at operation 701C. Accordingly, the DL MU transmission includes one or more A-MPDUs for each STA. In one embodiment, the HT Control field in the MAC header of one or more MPDUs within each AMPDU of the DL MU PPDU for each scheduled STA has a first indication that the scheduling information for a UL MU acknowledgement frame transmission is included in the MPDU. When the first indication is set, the size of the HE variant of the HT Control field is longer than the size of HT Control field when the first indication is not set. In another embodiment, the lengths of the HE variant of the HT Control field and the HT Control field are the same.

Following generation of the DL MU frame/PPDU at operation 701, the method 700 may move to operation 703. At operation 703 the AP transmits the DL MU frame/PPDU to the addressed/target STAs. For example, as shown in FIG. 7B, the DL MU PPDU may be transmitted to STA1 and STA2 over a wireless channel. As noted above, the DL MU PPDU may utilize OFDMA and/or MIMO MU transmission techniques.

At operation 705 each STA addressed by the DL MU PPDU may receive and attempt to decode the DL MU PPDU. In particular, each targeted STA receives the DL MU PPDU and checks the header portion of one or more MPDUs in the one or more A-MPDUs. As noted above, the header portion of the frame may include acknowledgement scheme information/properties/characteristics, including (1) whether the acknowledgement is immediate or non-immediate, (2) whether the acknowledgement is multi-user or single user, and/or (3) scheduling information (e.g., a resource unit within a UL transmission) when a multi-user acknowledgement is selected.

At operation 707, the STAs that successfully received and decoded the appropriate portions of the DL MU PPDU may acknowledge receipt through the generation and the transmission of acknowledgement frames by each respective STA according to the acknowledgement information extracted from the DL frame. Acknowledgment may be performed after a predetermined period has elapsed since receipt of the DL frame (e.g., a short interframe space (SIFS) period or another interframe space (IFS) period). In one example shown in FIG. 7B, STA1 and STA2 may participate in an UL MU acknowledgement based on scheduling information included in headers of respective MPDUs. As shown, STA1 is allocated the lower half of an UL OFDMA frame while STA2 is allocated the upper half of the UL OFDMA frame to carry an acknowledgement (e.g., a BA/ACK).

Figure 8A:
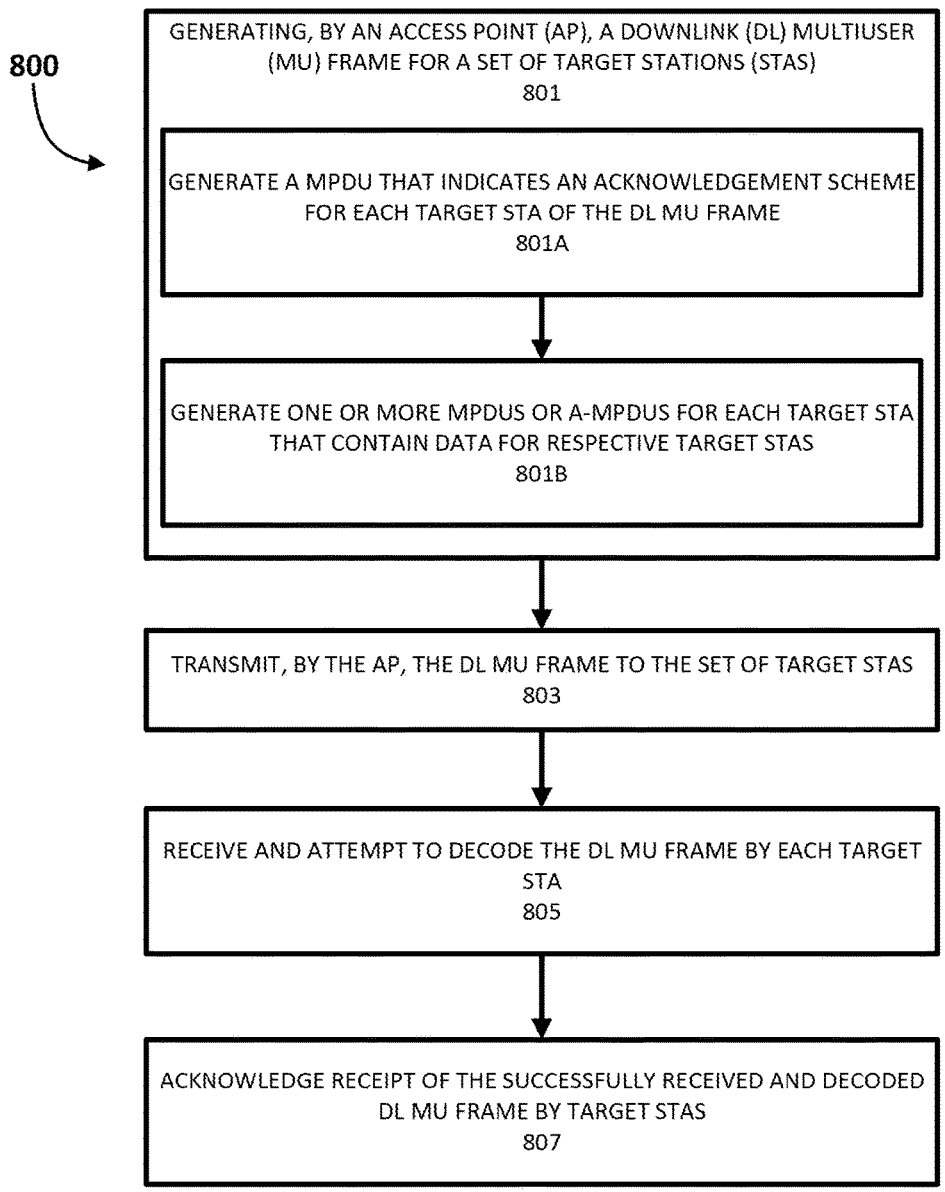
FIG. 8A illustrates a method for coordinating an UL MU acknowledgement/response transmission to a DL MU transmission according to a fourth embodiment.

Turning now to FIG. 8A, a method 800 will be described for coordinating UL MU acknowledgement/response transmissions to a DL MU transmission according to another embodiment. Similar to the methods 500, 600, and 700, the method 800 may be performed by one or more devices in the network 200. For example, one or more operations or sub-operations of the method 800 may be performed by the device 211, which is operating as an AP in the network 200, and/or the devices 212-215, which are operating as STAs in the network 200.

Figure 8B:
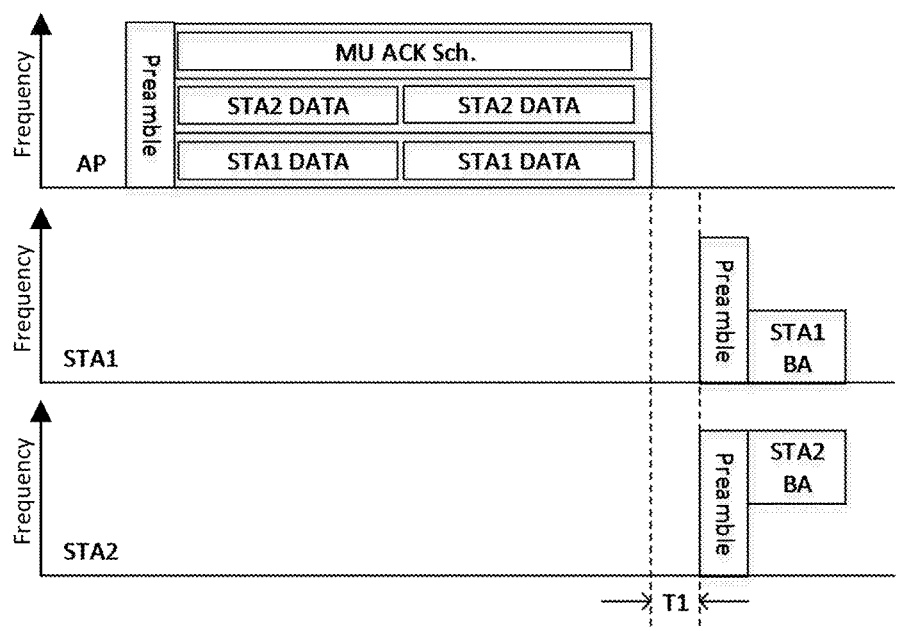
FIG. 8B illustrates a transmission diagram for coordinating an UL MU acknowledgement/response transmission according to the fourth embodiment.

Each operation of the method 800 will be described by way of example below in relation to the transmission diagram shown in FIG. 8B. Although one or more operations or sub-operations are described or shown in a particular sequential order, in other embodiments the operations/sub-operations may be rearranged in a different order, which may include performance of multiple operations in at least partially overlapping time periods.

The method 800 may commence at operation 801 with the generation of a DL MU PPDU/frame by an AP. The DL MU frame may be addressed to a set of target STAs operating in a network. For example, as shown in FIG. 8B, the DL MU frame may be addressed to STA1 and STA2. In this example, the AP schedules a DL OFDMA transmission to STA1 and STA2, wherein STA1 is allocated a lower third of the transmission bandwidth and STA2 is allocated a middle third of the transmission bandwidth. As will be described in greater detail below, the upper third of the transmission bandwidth may be used for a multicast or broadcast transmission to both STA1 and STA2. In the example shown in FIG. 8B, STA1 and STA2 are RE STAs or other devices that support UL MU transmissions. Although shown as an OFDMA frame/PPDU, the generated DL MU frame may be a MU-MIMO frame/PPDU. The generation of the frame at operation 801 may include the sub-operations described below.

At operation 801A, the AP may generate an MPDU that includes an acknowledgement scheme for each target STA of the DL MU frame. For instance, in the example shown in FIG. 8B, an acknowledgement scheme may be selected for both STA1 and STA2 and included in the MPDU generated at sub-operation 801A. This acknowledgement scheme information/properties/characteristics may indicate (1) whether the acknowledgement is immediate or non-immediate, (2) whether the acknowledgement is multi-user or single user, and/or (3) scheduling information (e.g., a resource unit within a UL transmission) when a multi-user acknowledgement is selected.

In one embodiment, the scheduling information for the UL MU acknowledgement frame transmission includes common information and a per-STA information. The common information is information that is the same for every STA in the UL MU acknowledgement frame transmission and the per-STA information is specific resource allocation information for each STA. Thus, different STAs scheduled in the same DL MU PPDU have different per-STA information while each STA has the same common information.

In one embodiment, the MPDU that includes an acknowledgement scheme for each target STA may be broadcast or multicast to target STAs. In one embodiment, the MPDU that includes an acknowledgement scheme for each target STA is multicast/broadcast to at least those STAs that are scheduled for an immediate MU acknowledgement transmission. For example, as shown in FIG. 8B, acknowledgment information/scheduling MPDU may be transmitted to STA1 and STA 2 in a resource unit of an OFDMA frame (i.e., the upper third of the transmission bandwidth of the DL MU frame). However, in other embodiments, other multicast and broadcast techniques may be employed.

Although shown and described in relation to the STAs that participated in the DL MU transmission, in other embodiments, the DL MU transmission may request other STAs to participate in the UL MU acknowledgment transmission.

Following generation of an MPDU that includes an acknowledgement scheme for each target STA, sub-operation 801B may generate one or more data MPDUs for each target STA. For example, as shown in FIG. 8B, one or more MPDUs may be generated for STA1 and one or more MPDUs may be generated for STA2. The one or more MPDUs for each target STA may include data (e.g., voice, video, best effort, background, or control data) that is specifically intended for the particular STA. In some embodiments, the data MPDUs for each STA may be separately aggregated into one or more A-MPDUs.

Accordingly, the DL MU transmission includes (1) a single MPDU that includes an acknowledgement scheme for each target STA and (2) one or more MPDUs or A-MPDUs for each STA. The MPDU that includes an acknowledgement scheme for each target STA may be broadcast or multicast to target STAs while the data MPDUs/A-MPDUs are each addressed to a corresponding STA. For example, using the example in FIG. 8B, the single MPDU that includes an acknowledgement scheme for each target STA is addressed to both STA1 and STA2 in an upper third of the DL MU PPDU, data MPDUs/A-MPDUs addressed to STA2 are located in a middle third of the DL MU PPDU, and data MPDUs/A-MPDUs addressed to STA1 are located in a lower third of the DL MU PPDU.

Using the above indications, since legacy STAs cannot participate in UL MU acknowledgement transmissions, legacy STAs may be assigned a SU acknowledgement while non-legacy STAs may be assigned a MU acknowledgement. In some embodiments, the data MPDUs may include an ACK Policy subfield that is set according to Table 1 and is consistent with the acknowledgment information in the broadcast/multicast frame in the DL MU PPDU.

Following generation of the DL MU frame/PPDU at operation 801, the method 800 may move to operation 803. At operation 803 the AP transmits the DL MU frame/PPDU to the addressed/target STAs. For example, as shown in FIG. 8B, the DL MU PPDU may be transmitted to STA1 and STA2 over a wireless channel. As noted above, the DL MU PPDU may utilize OFDMA and/or MIMO MU transmission techniques.

At operation 805 each STA addressed by the DL MU PPDU may receive and attempt to decode the DL MU PPDU. In particular, each targeted STA receives the DL MU PPDU and determines resource units or particular portions of the frame assigned to the STA by examining the preamble portion of the DL MU PPDU/frame. In the example shown in FIG. 8B, STA1 would determine that the lower third of the DL MU transmission bandwidth is a transmission intended for STA1 and the upper third of the DL MU transmission bandwidth is a multicast/broadcast transmission intended for STA1 and STA2. Specifically, as noted above, the upper third of the transmission bandwidth includes acknowledgement scheme information for STA1 and STA2, including (1) whether acknowledgement of the DL MU frame is immediate or non-immediate, (2) whether the acknowledgement is multi-user or single user, and/or (3) scheduling information (e.g., a resource unit within a UL transmission) when a multi-user acknowledgement is selected. In contrast, the unicast transmission directed to STA1 is data specifically intended for this device. In some embodiments, the broadcast/multicast frame may include scheduling/trigger information for coordinating the UL MU acknowledgment transmission while one or more data MPDUs addressed to each STA may include indications of whether the acknowledgment transmission is immediate/non-immediate and/or MU/SU.

At operation 807, the STAs that successfully received and decoded the appropriate portions of the DL MU PPDU may acknowledge receipt through the generation and the transmission of acknowledgement frames by each respective STA according to the acknowledgement information extracted from the DL frame. Acknowledgment may be performed after a predetermined period has elapsed since receipt of the DL frame (e.g., a short interframe space (SIFS) period or another interframe space (IFS) period). In one example shown in FIG. 8B, STA1 and STA2 may participate in an UL MU acknowledgement based on scheduling information included in a multicast/broadcast MPDU. As shown, STA1 is allocated the lower half of an UL OFDMA frame while STA2 is allocated the upper half of the UL OFDMA frame to carry an acknowledgement (e.g., a BA/ACK).

As described in methods 500, 600, 700, and 800, each target STA of a DL MU transmission may transmit an acknowledgement according to one or more schemes/techniques. In some embodiments, the acknowledgement schemes/techniques may involve a delayed acknowledgement. In these situations, the AP may transmit a trigger frame to trigger the STAs participating in the delayed acknowledgement to transmit a respective portion of the acknowledgement frame. For example, FIG. 9 show one example of this procedure.

Figure 9:
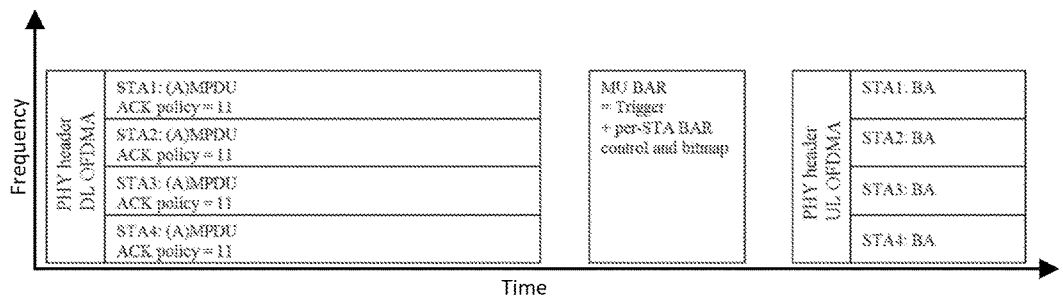
FIG. 9 illustrates a trigger frame for coordinating an UL MU acknowledgement/response transmission to a DL MU transmission according to an embodiment.

As shown in FIG. 9, an access point transmits a DL MU frame to a set of target STAs (e.g., STA1, STA2, STA3, and STA4). The DL MU frame may indicate that a non-immediate acknowledgement is to be transmitted by one or more of the target STAs. As shown in FIG. 9, the ACK policy subfield for each target STA is set to "11", which indicates that each STA is to participate in a non-immediate (i.e., block) acknowledgement.

The participating STAs may wait for a BAR or a MU BAR frame (hereinafter to be described in relation to MU BAR for simplicity). The MU BAR frame may be a trigger frame that includes trigger information and per-STA BAR control and bitmap information. Upon receipt of the MU BAR, each STA retrieves corresponding scheduling information from the MU BAR frame. The BAR frame may be implemented using various schemes and techniques. For example, a single MU BAR frame may be constructed and transmitted by the AP, wherein the MU BAR frame comprises BAR information for each scheduled STA and UL BA transmission scheduling information for each scheduled STA. In another example embodiment, an AP sends an A-MPDU to each scheduled STA in the DL MU transmission and the A-MPDU comprises BAR information and UL BA transmission scheduling information. In another embodiment, an AP sends the following frames in a DL MU transmission: 1) one BAR frame to each STA and 2) one broadcast/multicast frame for UL MU BA transmission. Based on the scheduling information, each STA participates in the MU acknowledgement a predetermined period following receipt of the MU BAR (e.g., a SIFS period).

In some embodiments, either a SU or MU immediate acknowledgement may be scheduled by the DL MU frame and may be transmitted prior to the MU BAR and consequential MU delayed acknowledgement. In some embodiments, multiple delayed SU or MU acknowledgements may be triggered for one DL MU frame and different sets of STAs. For example, a DL MU frame may be addressed to a first set of STAs and a second set of STAs. The AP may transmit a first BAR to trigger an acknowledgment transmission from the first set of STAs and a second BAR to trigger an acknowledgement transmission from the second set of STAs.

Although the methods and techniques above are described and shown separately, in one or more embodiments, these methods and techniques may be combined. For example, in some embodiments, acknowledgment information for a first STA may be located in the header of a data MPDU while acknowledgment information for a second STA may be located in a separate MPDU. In this example, the acknowledgment information may facilitate/trigger both the first and second STA to participate in the same UL MU transmission or in separate UL SU/MU transmissions.

Although the methods and techniques above have been described in relation to pure acknowledgment transmissions, in some embodiments the UL MU acknowledgment transmission may allow data transmission from some STAs. For example, a first set of STAs may transmit a set of acknowledgements while a second set of STAs may transmit data (e.g., video, voice, etc.) in designated resource units of the same UL MU transmission. In another example, a STA (either participating in a SU or MU transmission) may transmit both an acknowledgement and data in the same PPDU.

As noted above, acknowledgements may be transmitted using several MU multiplexing techniques, including OFDMA and MU-MIMO. However, multiplexing acknowledgement frames together in an OFDMA manner may have several technical issues that need to be resolved. One of the issues is that multiplexed acknowledgement frames cannot use a non-HT frame format because non-HT frame formats do not support MU transmissions, such as MU-MIMO and OFDMA. Therefore, in some embodiments, multiplexed acknowledgement frames shall use the HE frame format as defined in 802.11ax and shown in FIG. 4C.

Figure 10:
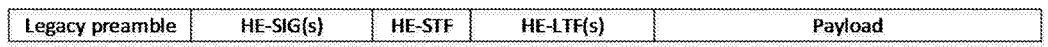
FIG. 10 illustrates an example of a HE frame according to one embodiment.

FIG. 10 shows another example of an HE frame format. In FIGS. 4C and 10, the legacy preamble may include fields that are needed to support backward compatibility with previous frame formats. These legacy fields may include a legacy-short training field (L-STF), a legacy-long training field (L-LTF), and a legacy-signaling field (L-SIG). A High Efficiency signaling field (HE-SIG) includes information required to interpret a HE PPDU. HE-SIG fields may include at least an HE-SIG-A field and optionally a HE-SIG-B field. The size of the HE-SIG-A field is fixed and the HE-SIG-A field indicates common control information for the frame. The HE-SIG-B field comprises per-STA specific information. After the HE-SIG fields, the HE-STF/LTF fields follow, wherein the HE-STF/LTF fields are needed for automatic gain control (AGC) settings, frequency offset compensation, channel estimation, etc. Further, the HE-LTF section may start at the same time and end at the same time across all users/STAs in case of MU transmission.

In case of a UL MU transmission, an UL MU PPDU (e.g., MU-MIMO and/or OFDMA frame) is sent as an immediate response to a trigger frame sent by an AP (as shown in FIG. 9). In this case, the legacy preamble part of the UL MU PPDU is combined together in the air based on transmissions from all the participating STAs. Accordingly, all participating STAs need to have the same information/data in the legacy preamble to ensure proper combination in the air. In some embodiments, the trigger frame may indicate to each STA what information is needed in the legacy preamble portion of the frame such that each STA transmits identical information for the legacy preamble portion of the UL MU PPDU.

Similarly, the HE-SIG fields must use identical information to ensure proper in air combination. Accordingly, per-STA information in the HE-SIG fields can be removed as the target receiver of the UL MU PPDU already knows this information. Further, the HE-SIG-B field of the HE UL MU PPDU can be entirely omitted. Since no HE-SIG-B field exists in the UL MU PPDU, there will not be an explicit indication of per-STA information such as bandwidth, modulation and coding scheme (MCS), and number of space-time streams (NSTS) in the legacy preamble and HE-SIG fields of the UL MU PPDU.

Figure 11:
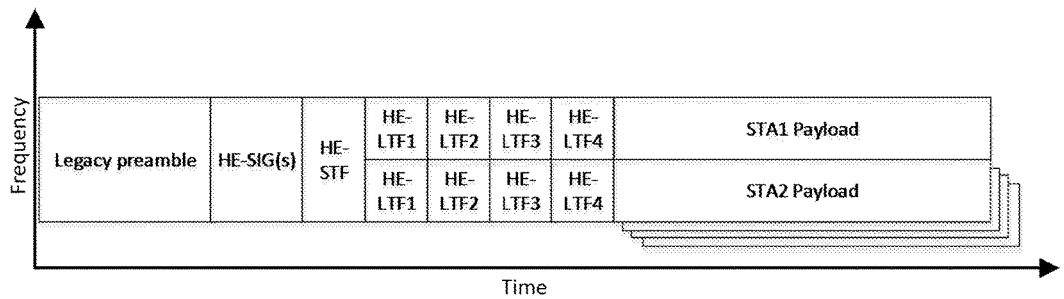
FIG. 11 illustrates an example of coordinating the number of HE long training fields (HE-LTF) in an UL MU transmission according to one embodiment.

In some UL MU transmissions that are sent as immediate responses to a DL trigger frame, because the trigger frame includes per-STA information such as MCS/NSTS/duration information for every STA, it is possible for each participating STA to identify how many LTFs to be used for the UL MU PPDU. In these cases, the number of HE-LTF symbols of a UL MU PPDU is equal to or greater than the required HE-LTF symbols for all participating STAs' transmissions. FIG. 11 illustrates one example on the number of required HE-LTF symbols. In this example, STA1 and STA2 are allocated for a MU transmission, wherein STA1 occupies the upper half of the channel bandwidth and STA2 occupies the lower half of the channel bandwidth. Further, the NSTS (e.g., the number of spatial streams) for STA1 is one and the NSTS for STA2 is four. In this case, to align the start and end point of the HE-LTF fields for both STAs, the number of HE-LTF symbols is set to four, which is the maximum required NSTS for STA1 and STA2.

However, in the case an acknowledgement frame is sent in a UL MU manner in response to DL MU transmission and there is no trigger information and/or no trigger frame (i.e., a frame separate and distinct from the DL MU transmission and that is sent to multiple STAs in the DL MU transmission in a broadcast/multicast manner to cause these STAs to participate in a UL MU acknowledgement), it is hard for each STA to figure out the other STA's transmission information. Therefore, it is hard for each STA to identify the NSTS of the acknowledgement frame as each STA's transmission information is not shared. As described above, this information is necessary such that each STA may transmit an appropriate number of HE-LTF sequences to accommodate the largest NSTS of other STAs.

To overcome this problem with acknowledgement frame transmissions that are in response to a DL MU frame transmission, mechanisms are proposed that select an MCS and a number of spatial streams (or space-time streams) for transmitting response frames.

In one embodiment, if a control response frame is to be transmitted in an UL MU PPDU, the number of spatial streams (or space-time streams) per STA shall be limited to one. Therefore, every STA participating a UL MU transmission in response to a DL MU transmission will send an ACK/BA frame having the same number of HE-LTF symbols regardless of other participating STAs' channel conditions. Since each STA transmits the same number of HE-LTF symbols (e.g., one), the HE-LTF section of the ACK/BA frame can start and end at the same time for all transmission without knowing the transmission conditions for other STAs.

In some embodiments, a UL MU transmission may include both acknowledgment frames from a first set of STAs and data frames from a second set of STAs. In this case, the first set of STAs would transmit using a single spatial stream.

This above concept may be achieved in multiple ways. Some of the possible implementations are described herein; however, embodiments mentioned herein do not limit the applicability of the above concept.

In one embodiment, if a control response frame is to be transmitted in a UL MU manner, all participating STAs transmit the control response frame at a predetermined time after receiving an eliciting frame (e.g., a SIFS period or another IFS period). Further, the transmission sets the number of HE-LTF symbols to a value corresponding to a single space-time stream. The HE-LTF symbols provide a means for the receiver to estimate the MIMO channel between the set of constellation mapper outputs and the receive chain.

Figure 12:
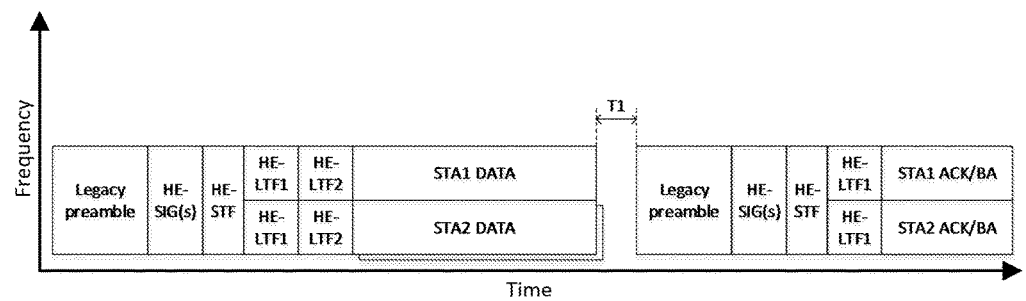
FIG. 12 illustrates an example of coordinating the number of HE-LTF in an UL MU transmission according to another embodiment.

FIG. 12 shows an example of this embodiment. In this example, an AP transmits data frames to STA1 and STA2 in a DL OFDMA manner, wherein STA1's data is assigned to the upper half of the channel bandwidth and STA2's data is assigned to the lower half of the channel bandwidth. Due to different channel conditions, the AP uses a single stream transmission to STA1 and two stream transmissions (spatial multiplexing) to STA2. To align the transmission time, the AP uses HE-LTF symbols corresponding to a two stream transmission (i.e., the number of HE-LTF symbols is two) for both STA1 and STA2.

After successfully decoding the DL OFDMA frame, STA1 and STA2 send back acknowledgement (ACK or BA) frames in an OFDMA manner a predetermined time (e.g., SIFS) after receiving the DL OFDMA frame. When STA1 and STA2 construct the acknowledgement frame in an OFDMA manner, the number of HE-LTF symbols is set to a value corresponding to a single space-time stream (i.e., the number of HE-LTF symbols is equal to one). Although a single space-time stream is used herein, in other embodiments, other numbers of space-time streams may be used (e.g., two space-time streams may be used, which would correspond to two HE-LTF symbols in the UL MU frame).

In some embodiments, Space-Time-Block-Coding (STBC) shall be disabled for the acknowledgement frame transmission. For example, STBC may be disabled when the number of space-time streams is equal to one.

In one embodiment in which the number of HE-LTF symbols in a UL MU transmission is set to a value, a first value is indicated by the transmitter of the eliciting frame as the length of the control response frame and the MCS of the control response frame is set such that the length of the control response frame is not greater than the first value.

For example, the first value may be included in the eliciting frame. In another example the first value is indicated before sending the eliciting frame (e.g., the first value is included in a first management frame (e.g., a beacon frame, a Probe Response frame, or an Association response frame) sent by the transmitter of the eliciting frame).

In one embodiment, if a control response frame is to be transmitted in a UL MU manner, an MCS shall be selected from a first set, wherein the MCS defines modulation/coding schemes and the number of space-time streams, wherein the number of space-time streams of the first set is limited to one. In one embodiment, all <VHT-MCS, NSS> tuples defined in the IEEE 802.11ac standard are further eliminated from the first set. In one embodiment, all MCSs that have a data rate greater than the data rate of the eliciting PPDU are further eliminated from the first set. In one embodiment, a transmitter of an eliciting frame for the control response frame further informs information related to the length of the control response frame. All MCSs that result in the encoded control response frame having a length that exceeds the informed length are further eliminated from the first set. In one embodiment, all MCSs that do not meet certain criteria are further eliminated from the first set and if the first set is empty, the MCS shall be selected from a second set.

In another embodiment, if a control response frame is to be transmitted in a UL MU manner, all participating STAs transmit the control response frame in a predetermined time (e.g., SIFS) after receiving an eliciting frame. In this embodiment, the eliciting frame may indicate that the number of HE-LTF symbols for the control response frame is a second value. In some embodiments, the second value is indicated by the transmitter of the eliciting frame and the RE-LTF symbols provide a means for the receiver to estimate the MIMO channel between the set of constellation mapper outputs and the receive chain. In one embodiment, a first value is indicated by the transmitter of the eliciting frame as the length of the control response frame. The MCS of the control response frame is set such that the length of the control response frame is not greater than the first value. In one embodiment, the first value and/or the second value are included in the eliciting frame. In another embodiment, the first value and/or the second value are indicated before sending the eliciting frame. For example, the first value is included in a first management frame (e.g., a Beacon Frame, a Probe Response frame, or Association Response frame) sent by the transmitter of the eliciting frame.

In another embodiment, if a control response frame is to be transmitted in a UL MU manner, an MCS shall be selected from a first set, wherein the MCS defines modulation/coding schemes and the number of space-time streams. In this embodiment, the number of space-time streams of the first set is limited to a second value. In one embodiment, information on the second value is included in the eliciting frame. In another embodiment, the second value is indicated before sending the eliciting frame. For example, the second value is included in a first management frame (e.g., a Beacon Frame, a Probe Response frame, or an Association Response frame) sent by the transmitter of the eliciting frame. In one embodiment, all <VHT-MCS, NSS> tuples defined in the IEEE 802.11ac standard are further eliminated from the first set. In one embodiment, all MCSs that have a data rate greater than the data rate of the eliciting PPDU are further eliminated from the first set. In one embodiment, a transmitter of an eliciting frame for the control response frame further informs information related to the length of the control response frame, and all MCSs that the length of the encoded control response frame exceeds the informed length of the control response frame are further eliminated from the first set. In one embodiment, upon determining that the highest number of spatial streams (or space-time streams) value of the MCS in the first set is less than or equal to a third number of spatial streams (or space-time streams) value of the received frame, eliminating all MCSs from the first set that have the number of spatial streams (or space-time streams) value that is not equal to the third number of streams. In one embodiment, all MCSs that do not meet certain criteria are further eliminated from the first set and if the first set is empty, the MCS shall be selected from a second set.

As described above, an apparatus or a station comprising means (e.g., 310) may be adapted for performing one or more methods or operations described herein. Further, these apparatuses or stations may include a computer-readable storage medium (e.g., 340, one or more internal, external or remote memories, or one or more registers) comprising instructions stored therein, the instructions comprising code for performing one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method for transmitting a response frame in a wireless network, the method comprising:
   receiving, by a wireless device, a downlink frame from an access point;
   identifying, by the wireless device, scheduling information in the downlink frame, the scheduling information soliciting an uplink response frame from the wireless device;
   in response to the scheduling information being located in a Media Access Control (MAC) header in the downlink frame, generating, by the wireless device based on the scheduling information, the uplink response frame responsive to the downlink frame, the uplink response frame including only a single high efficiency long training field (HE-LTF) that consists of a single orthogonal frequency-division multiplexing (OFDM) symbol; and
   transmitting, by the wireless device to the access point, the uplink response frame using the scheduling information.

2. The method of claim 1, wherein the uplink response frame is transmitted using a single spatial stream in response to the scheduling information being located in the MAC header in the downlink frame.

3. The method of claim 2, wherein the downlink frame is a multi-user downlink frame that is addressed to a plurality of stations in the wireless network, including the wireless device and the uplink response frame is part of a multi-user frame.

4. The method of claim 3, wherein the scheduling information includes assignment of resource units in the multi-user frame to the plurality of stations.

5. The method of claim 3, wherein the scheduling information provides an implicit indication for the wireless device to (1) generate the uplink response frame with the single HE-LTF consisting of the single OFDM symbol and (2) transmit the uplink response frame using a single spatial stream.

6. The method of claim 2, wherein generating the uplink response frame includes providing an acknowledgement (ACK) or a block acknowledgement (BA) in the uplink response frame.

7. The method of claim 6, wherein the ACK or BA in the uplink response frame indicates successful receipt of a media access control (MAC) Protocol Data Unit (MPDU) within the downlink frame and the MAC header is within the MPDU.

8. The method of claim 1, wherein the uplink response frame is transmitted with space-time block coding disabled in response to the scheduling information being located in the MAC header in the downlink frame.

9. A wireless device for transmitting a response frame in a wireless network, the wireless device comprising:
 one or more memories; and
 one or more processors coupled to the one or more memories, the one or more processors configured to:
  process a downlink frame received from an access point;
  identify scheduling information in the downlink frame, the scheduling information soliciting an uplink response frame from the wireless device;
  generate, based on the scheduling information, an uplink response frame to the downlink frame, wherein in response to the scheduling information being located in a Media Access Control (MAC) header in the downlink frame the uplink response frame includes a high efficiency short training field (HE-STF) followed immediately by a single High Efficiency Long Training Field (HE-LTF) consisting of a single orthogonal frequency-division multiplexing (OFDM) symbol and the single OFDM symbol of the HE-LTF is immediately followed by one or more data symbols; and
  transmit, to the access point, the uplink response frame using the scheduling information.

10. The wireless device of claim 9, wherein the uplink response frame is transmitted using a single spatial stream in response to the scheduling information being located in the MAC header in the downlink frame.

11. The wireless device of claim 10, wherein the downlink frame is a multi-user downlink frame that is addressed to a plurality of stations in the wireless network, including the wireless device and the uplink response frame is part of a multi-user frame.

12. The wireless device of claim 11, wherein the scheduling information includes assignment of resource units in the multi-user frame to the plurality of stations.

13. The wireless device of claim 11, wherein the scheduling information provides an implicit indication for the wireless device to (1) generate the uplink response frame with the single HE-LTF consisting of the single OFDM symbol and (2) transmit the uplink response frame using a single spatial stream.

14. The wireless device of claim 10, wherein generating the uplink response frame includes providing an acknowledgement (ACK) or a block acknowledgement (BA) in the uplink response frame.

15. The wireless device of claim 14, wherein the ACK or BA in the uplink response frame indicates successful receipt of a media access control (MAC) Protocol Data Unit (MPDU) within the downlink frame and the MAC header is within the MPDU.

16. The wireless device of claim 9, wherein the uplink response frame is transmitted with space-time block coding disabled in response to the scheduling information being located in the MAC header in the downlink frame.

* * * * *

(12) EX PARTE REEXAMINATION CERTIFICATE (12369th)
United States Patent
Kwon et al.

(10) Number: US 10,153,886 C1
(45) Certificate Issued: Aug. 18, 2023

(54) APPARATUS AND METHOD FOR DOWNLINK AND UPLINK MULTI-USER TRANSMISSIONS

(71) Applicant: NEWRACOM, INC., Irvine, CA (US)

(72) Inventors: Young Hoon Kwon, Irvine, CA (US); Ahmad Reza Hedayat, Irvine, CA (US)

(73) Assignee: ATLAS GLOBAL TECHNOLOGIES LLC, Frisco, TX (US)

Reexamination Request:
No. 90/015,201, Feb. 28, 2023

Reexamination Certificate for:
Patent No.: 10,153,886
Issued: Dec. 11, 2018
Appl. No.: 15/352,435
Filed: Nov. 15, 2016

Related U.S. Application Data

(63) Continuation of application No. 15/078,920, filed on Mar. 23, 2016, now Pat. No. 9,531,520.

(60) Provisional application No. 62/140,349, filed on Mar. 30, 2015, provisional application No. 62/137,138, filed on Mar. 23, 2015.

(51) Int. Cl.
| | | |
|---|---|---|
| *H04L 5/00* | (2006.01) | |
| *H04W 72/04* | (2023.01) | |
| *H04W 72/12* | (2023.01) | |
| *H04L 1/18* | (2023.01) | |
| *H04W 72/0446* | (2023.01) | |
| *H04W 72/1268* | (2023.01) | |
| *H04L 1/1867* | (2023.01) | |
| *H04W 72/23* | (2023.01) | |
| *H04L 1/1829* | (2023.01) | |
| *H04L 1/1607* | (2023.01) | |
| *H04L 1/00* | (2006.01) | |

(52) U.S. Cl.
CPC .......... *H04L 1/1893* (2013.01); *H04L 1/1685* (2013.01); *H04L 1/18* (2013.01); *H04L 1/1861* (2013.01); *H04L 1/1887* (2013.01); *H04L 1/1896* (2013.01); *H04L 5/0055* (2013.01); *H04W 72/0446* (2013.01); *H04W 72/1268* (2013.01); *H04W 72/23* (2023.01); *H04L 1/1854* (2013.01); *H04L 2001/0093* (2013.01)

(58) Field of Classification Search
None
See application file for complete search history.

(56) References Cited

To view the complete listing of prior art documents cited during the proceeding for Reexamination Control Number 90/015,201, please refer to the USPTO's Patent Electronic System.

*Primary Examiner* — Matthew E Heneghan

(57) ABSTRACT

Methods and devices are described that facilitate uplink multi-user acknowledgment transmissions. In particular, acknowledgment information may be located in a media access control (MAC) header of a payload section of a MAC Protocol Data Unit within a downlink multi-user frame. The acknowledgment information may be present in each resource unit of the downlink multi-user frame to indicate to each corresponding station properties/characteristics of a subsequent acknowledgment transmission. The properties may include one or more of (1) whether the acknowledgement transmission is multi-user or single user, (2) whether the acknowledgement transmission is transmitted immediately following receipt of the downlink multi-user frame or upon receipt of a multi-user block acknowledgement request frame, and (3) resource scheduling information for an uplink multi-user acknowledgement transmission.

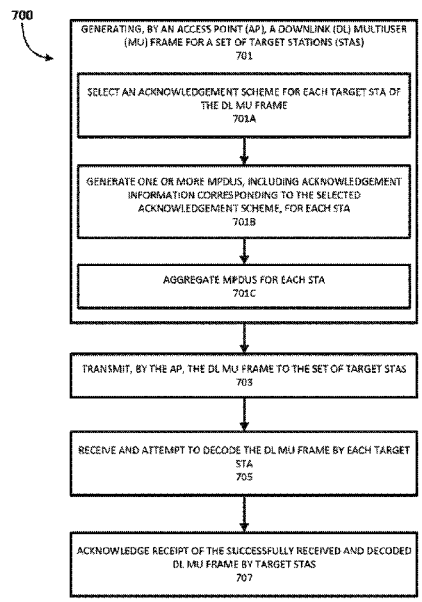

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1, 2, 9 and 10 is confirmed.

Claims 3-8 and 11-16 were not reexamined.

\* \* \* \* \*